United States Patent
Ando

(10) Patent No.: US 10,055,183 B2
(45) Date of Patent: Aug. 21, 2018

(54) PRINTING SYSTEM, PRINTING APPARATUS AND NON-TRANSITORY COMPUTER-READABLE MEDIUM STORING INSTRUCTIONS TO TERMINAL APPARATUS

(71) Applicant: BROTHER KOGYO KABUSHIKI KAISHA, Nagoya-shi, Aichi-ken (JP)

(72) Inventor: Satoko Ando, Chita (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 15/392,336

(22) Filed: Dec. 28, 2016

(65) Prior Publication Data

US 2017/0199710 A1 Jul. 13, 2017

(30) Foreign Application Priority Data

Jan. 8, 2016 (JP) .................. 2016-002329

(51) Int. Cl.
G06F 3/12 (2006.01)

(52) U.S. Cl.
CPC .......... *G06F 3/1268* (2013.01); *G06F 3/1222* (2013.01); *G06F 3/1238* (2013.01); *G06F 3/1267* (2013.01); *G06F 3/1274* (2013.01); *G06F 3/1285* (2013.01)

(58) Field of Classification Search
USPC ....................................... 358/1.14
See application file for complete search history.

(56) References Cited

U.S. PATENT DOCUMENTS

| | | | | |
|---|---|---|---|---|
| 2009/0190166 A1* | 7/2009 | Nakamura | ............ | G06F 3/1219 358/1.15 |
| 2009/0237728 A1* | 9/2009 | Yamamoto | ............ | G06F 3/1454 358/1.15 |
| 2009/0257078 A1* | 10/2009 | Sawada | ................ | G06F 21/608 358/1.14 |

(Continued)

FOREIGN PATENT DOCUMENTS

JP H11-45034 A 2/1999

*Primary Examiner* — Ngon Nguyen
(74) *Attorney, Agent, or Firm* — Scully, Scott, Murphy & Presser, P.C.

(57) ABSTRACT

A printing system includes a terminal apparatus and a printing apparatus. The terminal apparatus includes: a first inputting section; and a processor configured to: transmit a print request for printing an object image indicated by object data to the printing apparatus; receive first input authentication information inputted by a user; and transmit the first input authentication information to the printing apparatus. The printing apparatus includes: a second inputting section; a printing section; a processor configured to: receive the print request; store the object data and associated authentication information included in the print request while associating with each other in a first memory; receive the first input authentication information; determine whether the first input authentication information matches the associated authentication information; receive input of second input authentication information from the user; and determine whether the second input authentication information matches the associated authentication information.

16 Claims, 11 Drawing Sheets

(56) References Cited

U.S. PATENT DOCUMENTS

| | | | |
|---|---|---|---|
| 2012/0218609 A1* | 8/2012 | Kota | G06F 3/1222 |
| | | | 358/3.28 |
| 2013/0038903 A1* | 2/2013 | Maki | G06F 3/1204 |
| | | | 358/1.15 |
| 2014/0139892 A1* | 5/2014 | Shimizu | H04N 1/00204 |
| | | | 358/474 |
| 2014/0313539 A1* | 10/2014 | Kawano | G06F 21/44 |
| | | | 358/1.14 |
| 2015/0264129 A1* | 9/2015 | Takeuchi | H04L 67/1044 |
| | | | 709/205 |

* cited by examiner

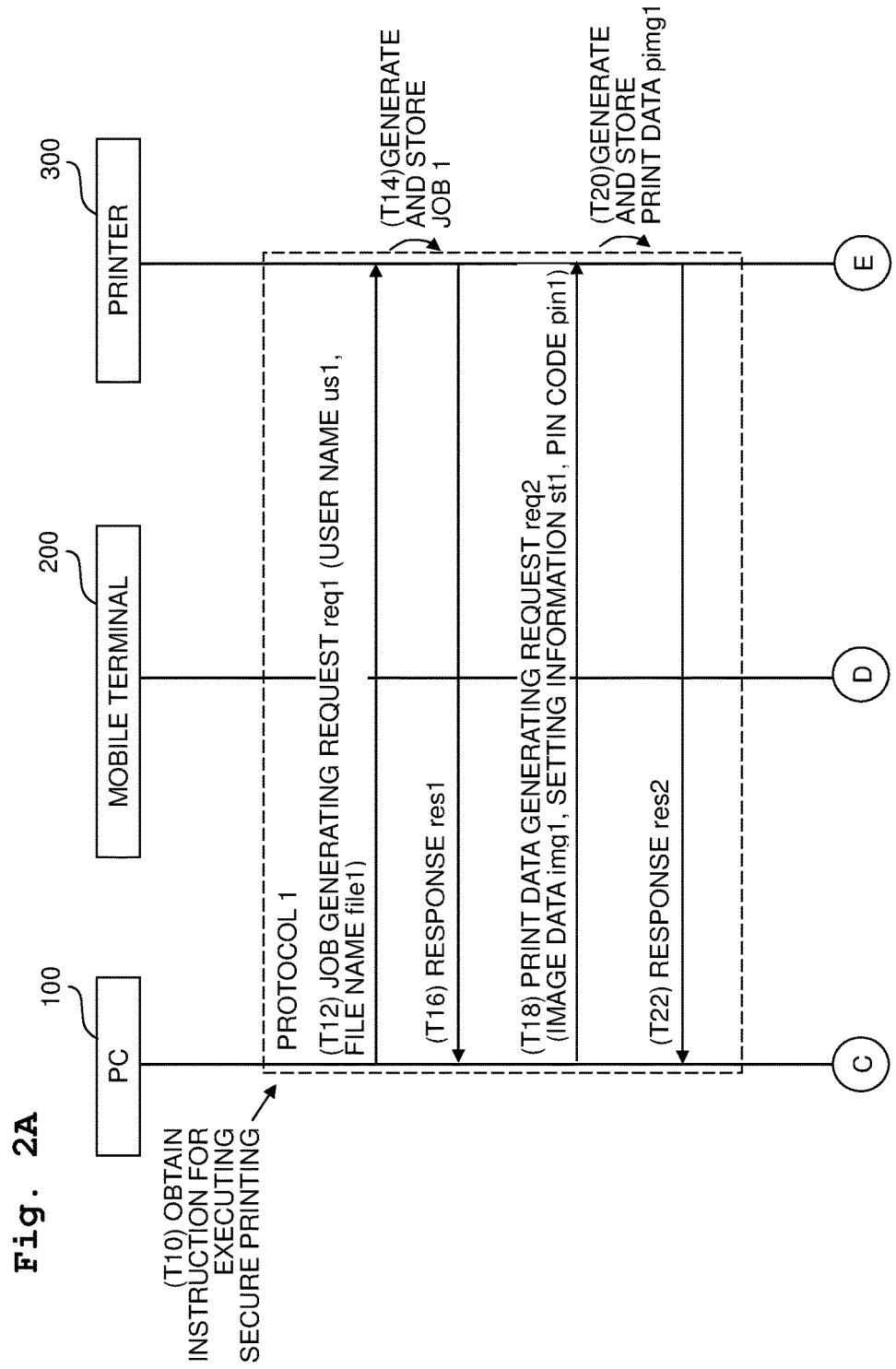

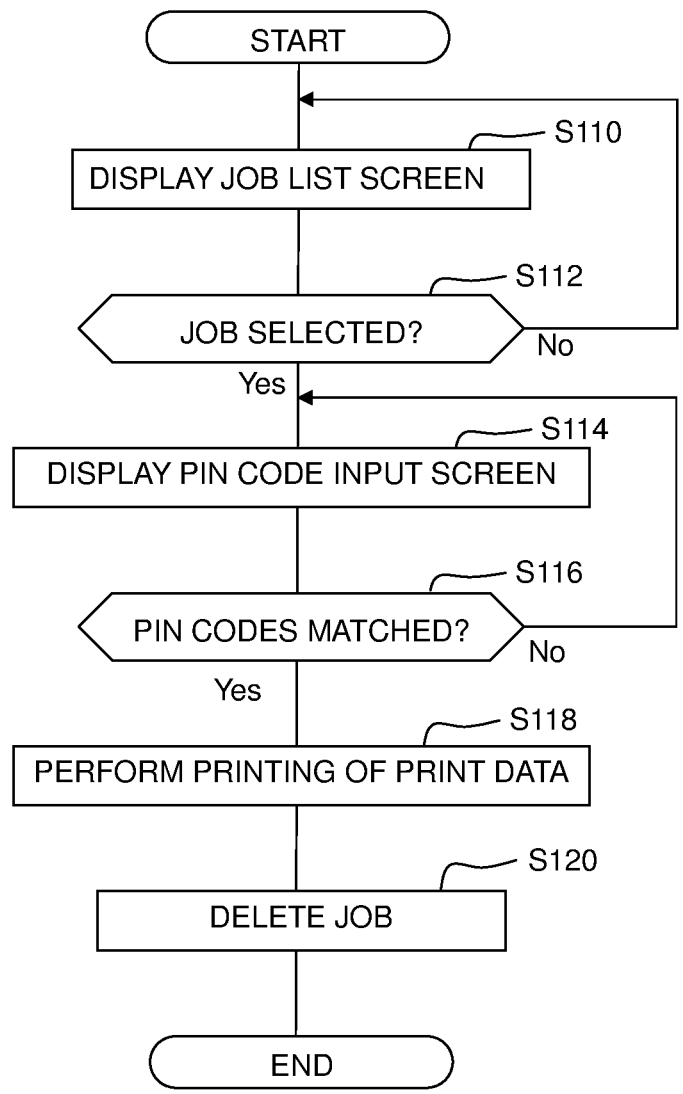

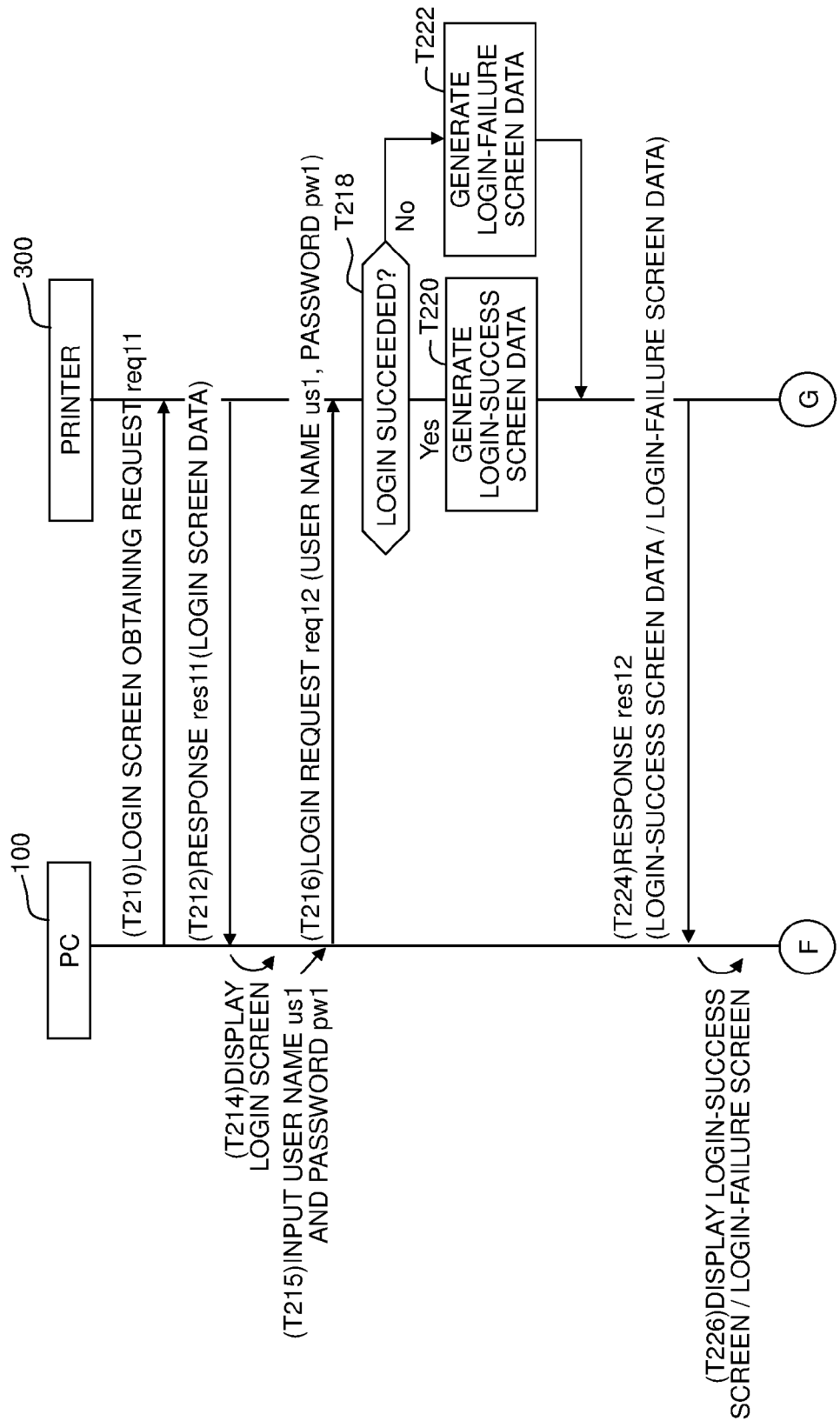

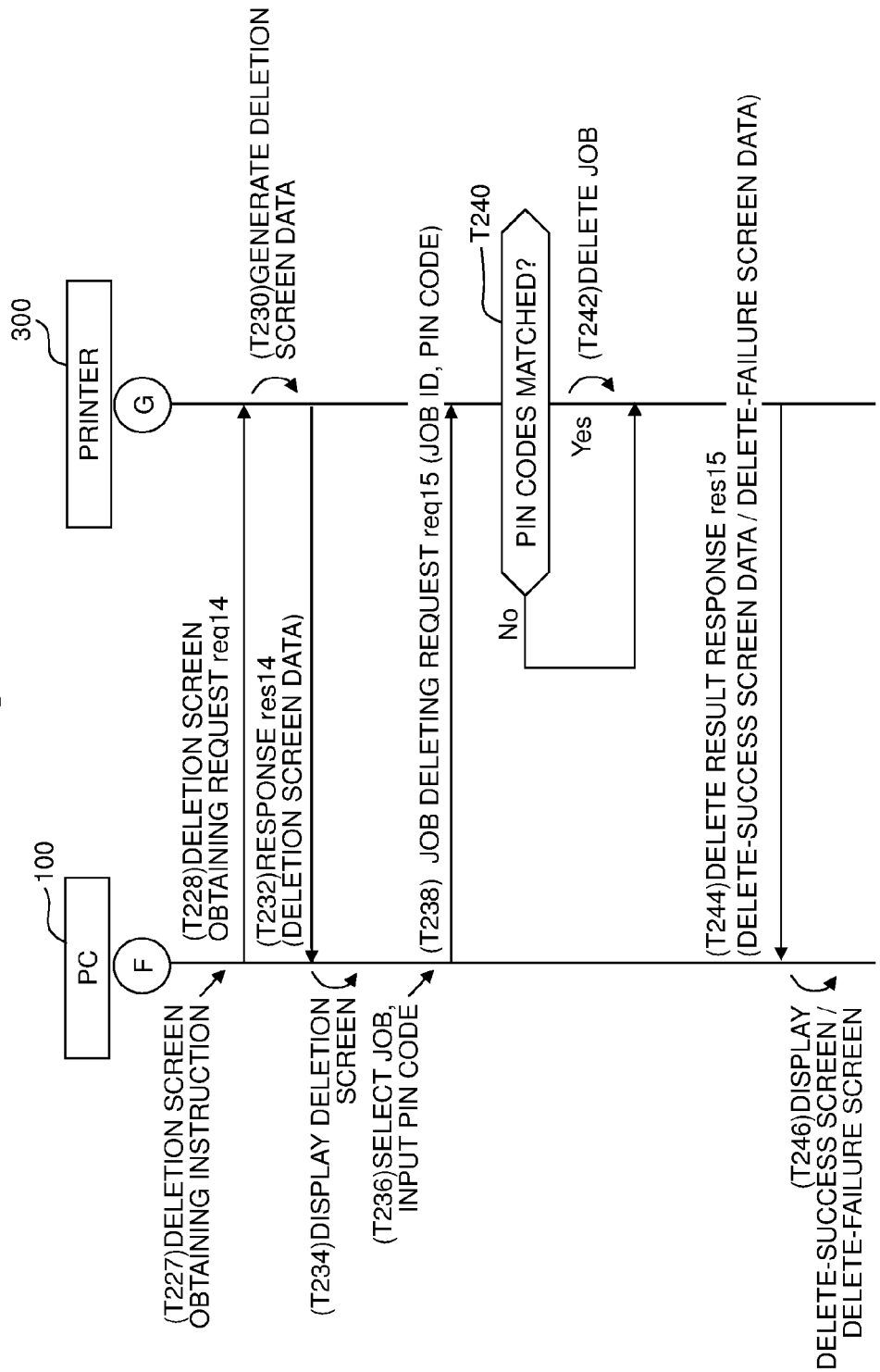

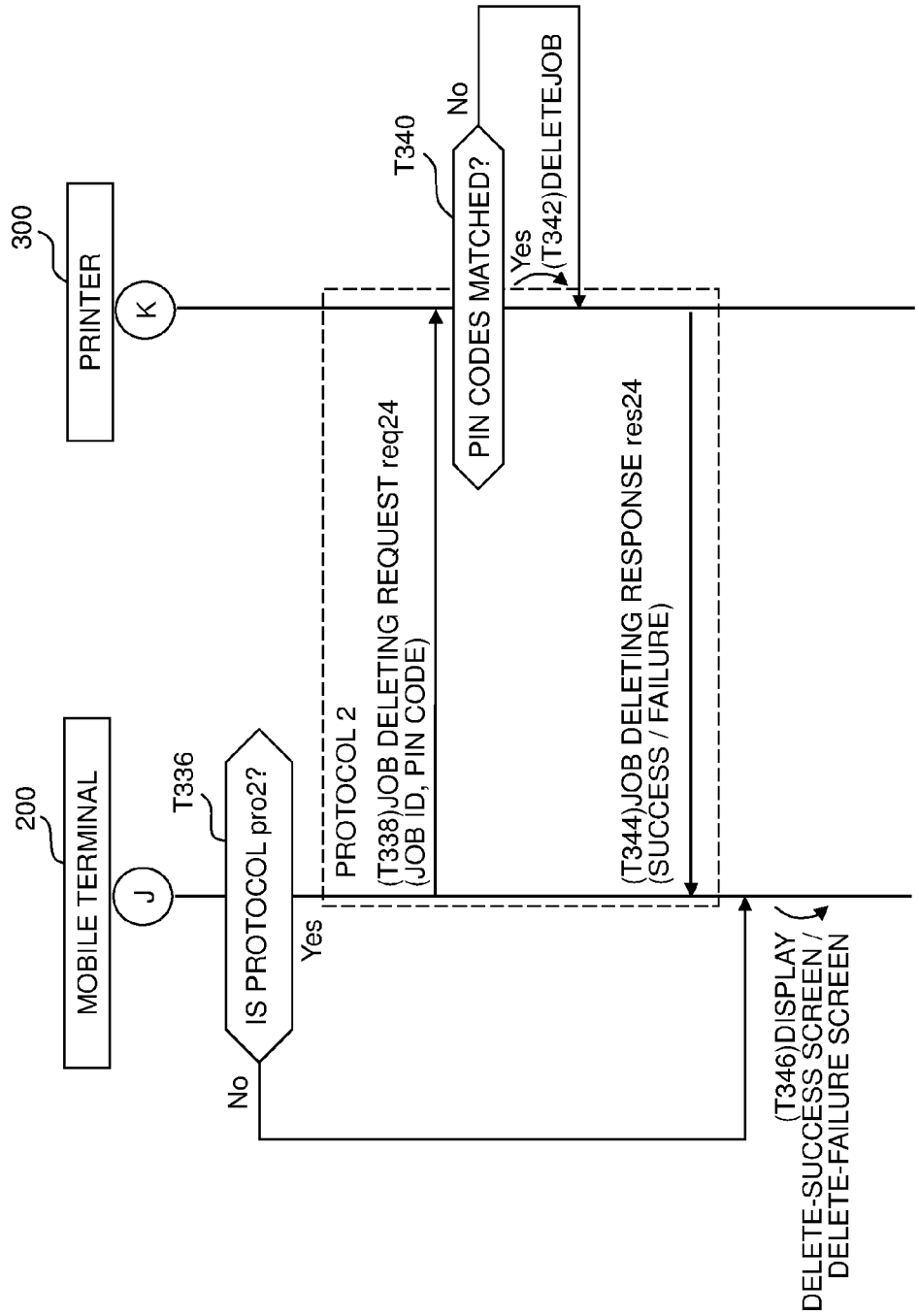

PRINTING SYSTEM, PRINTING APPARATUS AND NON-TRANSITORY COMPUTER-READABLE MEDIUM STORING INSTRUCTIONS TO TERMINAL APPARATUS

CROSS REFERENCE TO RELATED APPLICATION

The present application claims priority from Japanese Patent Application No. 2016-002329 filed on Jan. 8, 2016 the disclosure of which is incorporated herein by reference in its entirety.

BACKGROUND

Field of the Invention

The present invention relates to a printing system, a printing apparatus and a non-temporary and computer-readable medium storing instruction to a terminal apparatus, capable of communicating with the printing apparatus, which are configured to delete an object data stored in a memory.

Description of the Related Art

Conventionally, there is known a configuration wherein an image forming apparatus stores an image data to which a password is added. In this image forming apparatus, the image data can be printed under a condition that a password is inputted by a user and the authentication (verification) for the inputted password is successful. Further, in a case that deletion of the image data added with the password and the stored in the image forming apparatus is instructed, the image forming apparatus displays a screen urging the input of the password. Then, in a case that the password is inputted by the user via the screen, the image forming apparatus determines whether or not the inputted password is the password added to the image data, and deletes the image data under a condition that the inputted password matches the password added to the image data.

SUMMARY

In the technique described in Japanese Patent Application Laid-open No. H11-045034, in a case that the user wishes to delete the image data, the user is required to go in front of the image forming apparatus, and to input the password via the screen of the image forming apparatus. Namely, the user is required to go to in front of the image forming apparatus for the sole purpose of deleting the image data. Accordingly, it takes the user's time and labor to delete the image data which is added with the password and stored in the image forming apparatus.

The present teaching has been made in view of the above-described situation, and an object of the present teaching is to provide a technique for reducing the time and labor of the user in a case of deleting data as an object to be deleted (object data) which is stored in the memory while being associated with associated (related) authentication information.

The present teaching has been made for solving at least a part of the above task, and can be realized by an aspect as described in the following.

According to a first aspect of the present teaching, there is provided a printing system including a terminal apparatus and a printing apparatus communicable with each other,
wherein the terminal apparatus includes:
a first inputting section;
a first network interface; and
a processor configured to:
transmit a print request for printing an object image indicated by object data via the first network interface to the printing apparatus, the print request including associated authentication information associated with the object data;
receive first input authentication information inputted by a user via the first inputting section, after the print request has been transmitted; and
transmit the received first input authentication information via the first network interface to the printing apparatus, and
the printing apparatus includes:
a second inputting section;
a second network interface;
a printing section; and
a processor configured to:
receive the print request via the second network interface from the terminal apparatus;
store the object data and the associated authentication information included in the print request while associating with each other in a first memory;
receive second input authentication information inputted by the user via the second inputting section, after the object data and the associated authentication information have been stored in the first memory;
determine whether the received second input authentication information inputted by the user via the second inputting section matches the associated authentication information stored in the first memory;
print the object image indicated by the object data by using the printing section, if the processor of the printing apparatus determines that the second input authentication information matches the associated authentication information;
receive the first input authentication information via the second network interface from the terminal apparatus, after the object data and the associated authentication information have been stored in the first memory;
determine whether the first input authentication information received from the terminal apparatus matches the associated authentication information stored in the first memory; and
delete the object data from the first memory without printing the object image indicated by the object data, if the processor of the printing apparatus determines that the first input authentication information matches the associated authentication information.

In the printing system according to the first aspect of the present teaching, the terminal apparatus transmits the first input authentication information inputted in the terminal apparatus to the printing apparatus. The printing apparatus deletes the object data associated with the associated authentication information from the first memory, if the received first input authentication information matches the associated authentication information stored in the first memory. Namely, the user can delete the object data from the first memory by inputting the first input authentication information to the terminal apparatus, without having to go in front of the printing apparatus and input the first input authentication information to the printing apparatus. Accordingly, it is possible to reduce the time and labor of the user in a case that the user wishes to delete the object data which is stored in the first memory while being associated with the associated authentication information.

According to a second aspect of the present teaching, there is provided a printing apparatus communicable with a terminal apparatus, the printing apparatus including:

an inputting section;
a network interface;
a printing section; and
a processor configured to:
receive a print request for printing an object image indicated by object data from the terminal apparatus via the network interface, the print request including associated authentication information associated with the object data;
store the object data and the associated authentication information included in the print request while associating with each other in a memory;
receive, from the terminal apparatus via the network interface, first input authentication information which is inputted to the terminal apparatus, after the object data and the associated authentication information have been stored in the memory;
determine whether the first input authentication information received from the terminal apparatus matches the associated authentication information stored in the memory;
receive second input authentication information inputted by a user via the inputting section, after the object data and the associated authentication information have been stored in the memory;
determine whether the received second input authentication information inputted via the inputting section matches the associated authentication information stored in the memory;
print the object image indicated by the object data by using the printing section, if the processor determines that the second input authentication information matches the associated authentication information; and
delete the object data from the memory without printing the object image indicated by the object data, if the processor determines that the first input authentication information matches the associated authentication information.

The printing apparatus according to the second aspect of the present teaching deletes, similarly to the first aspect, the object data associated with the associated authentication information, if the first input authentication information received from the terminal apparatus matches the associated authentication information stored in the memory. Namely, the user can delete the object data from the memory by inputting the first input authentication information to the terminal apparatus, without having to go in front of the printing apparatus and input the first input authentication information to the printing apparatus. Accordingly, it is possible to reduce the time and labor of the user in a case that the user wishes to delete the object data which is stored in the memory while being associated with the associated authentication information.

According to a third aspect of the present teaching, there is provided a non-transitory computer-readable medium storing instructions to a terminal apparatus which includes an inputting section, a display, and a network interface and which is communicable with a printing apparatus, the instructions, when executed by a processor of the terminal apparatus, causing the terminal apparatus to:

display, on the display, a deletion screen which is for a user to instruct deletion of object data from a first memory and which includes an item indicating identification information for identifying the object data, after a print request including associated authentication information associated with the object data and the identification information for identifying the object data has been received by the printing apparatus and then the object data, the associated authentication information, and the identification information have been stored in the first memory while being associated with one another, the print request being a request for printing an object image indicated by the object data;

receive input authentication information inputted by the user via the inputting section; and transmit, to the printing apparatus via the network interface, a delete request including the identification information and the input authentication information, if the deletion of the object data has been instructed via the deletion screen and then the input authentication information inputted by the user has been received, wherein the delete request is a request for deleting the object data from the first memory without printing the object image indicate by the object data if the input authenticating information included in the delete request matches the associated authentication information stored in the first memory while being associated with the identification information.

The instructions stored in the medium according to the third aspect of the present teaching cause the terminal apparatus to transmit, to the printing apparatus, the delete request for deleting the object data and including the input authentication information inputted via the inputting section of the terminal apparatus. Namely, the user can transmit, to the printing apparatus, the request for deleting delete the object data from the memory by inputting the input authentication information to the terminal apparatus, without having to go in front of the printing apparatus and input the input authentication information to the printing apparatus. Accordingly, it is possible to reduce the time and labor of the user in a case that the user wishes to delete the object data which is stored in the memory while being associated with the associated authentication information. Further, this configuration allows the user to instruct the object data to be deleted, based on the identification information included in the deletion screen displayed by the terminal apparatus.

Further, the terminal apparatus of the present teaching, and a controlling method, a computer program and a computer-readable recording medium storing the computer program which are configured to realize the functions of the printing system, the printing apparatus and the terminal apparatus of the present teaching are also novel and effective.

BRIEF DESCRIPTION OF THE DRAWINGS

FIGS. 2A and 2B are a sequence diagram of a data storage processing.
FIG. 3 is a flow chart of a data print processing.
FIGS. 4A and 4B are a sequence diagram of a data deletion processing of a first embodiment.
FIGS. 6A to 6C are a sequence diagram of a data deletion processing of a second embodiment.

DESCRIPTION OF THE EMBODIMENTS

First Embodiment

Figure 1A:
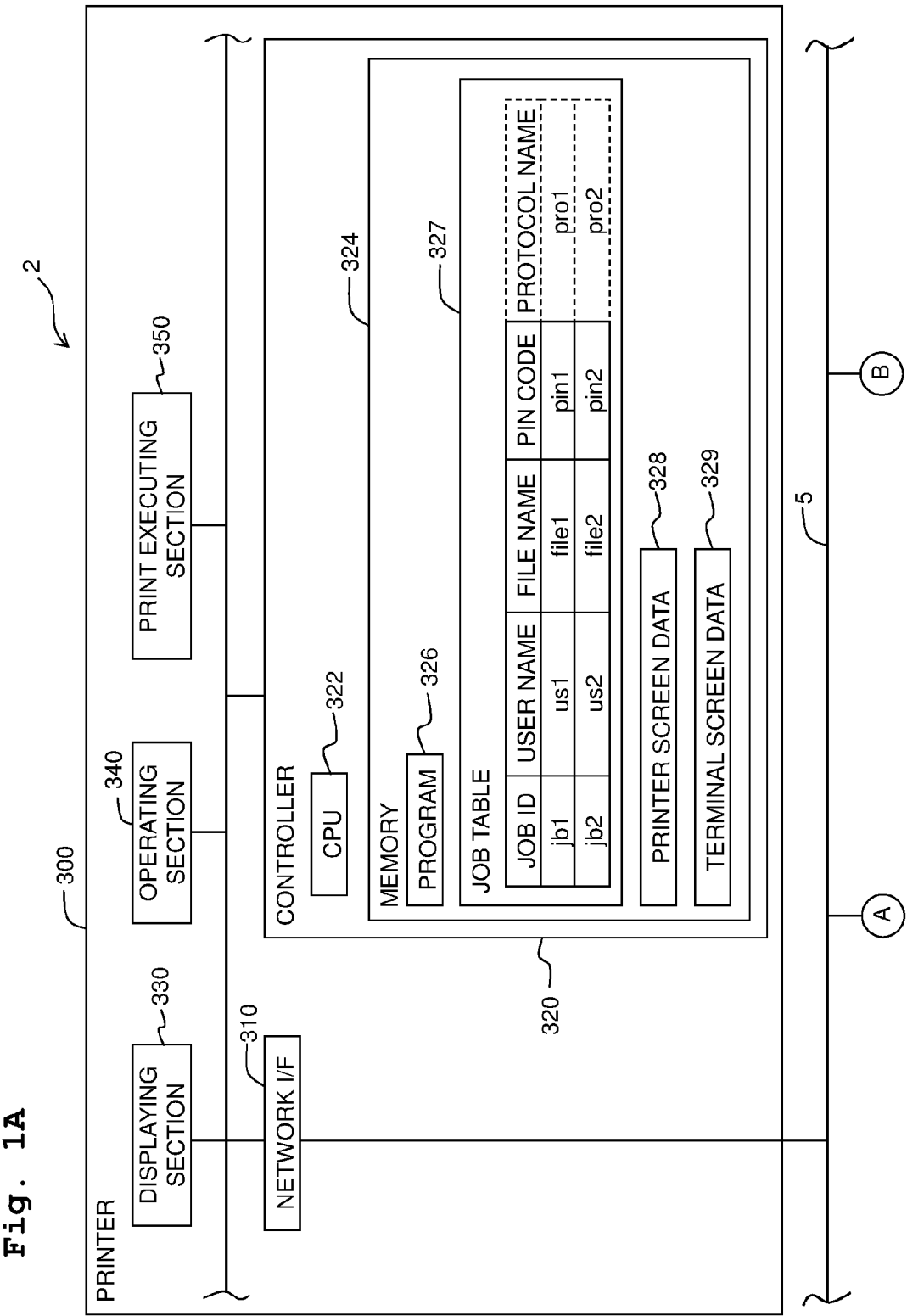
FIGS. 1A and 1B are views depicting the configuration of a printing system.
Figure 1B:
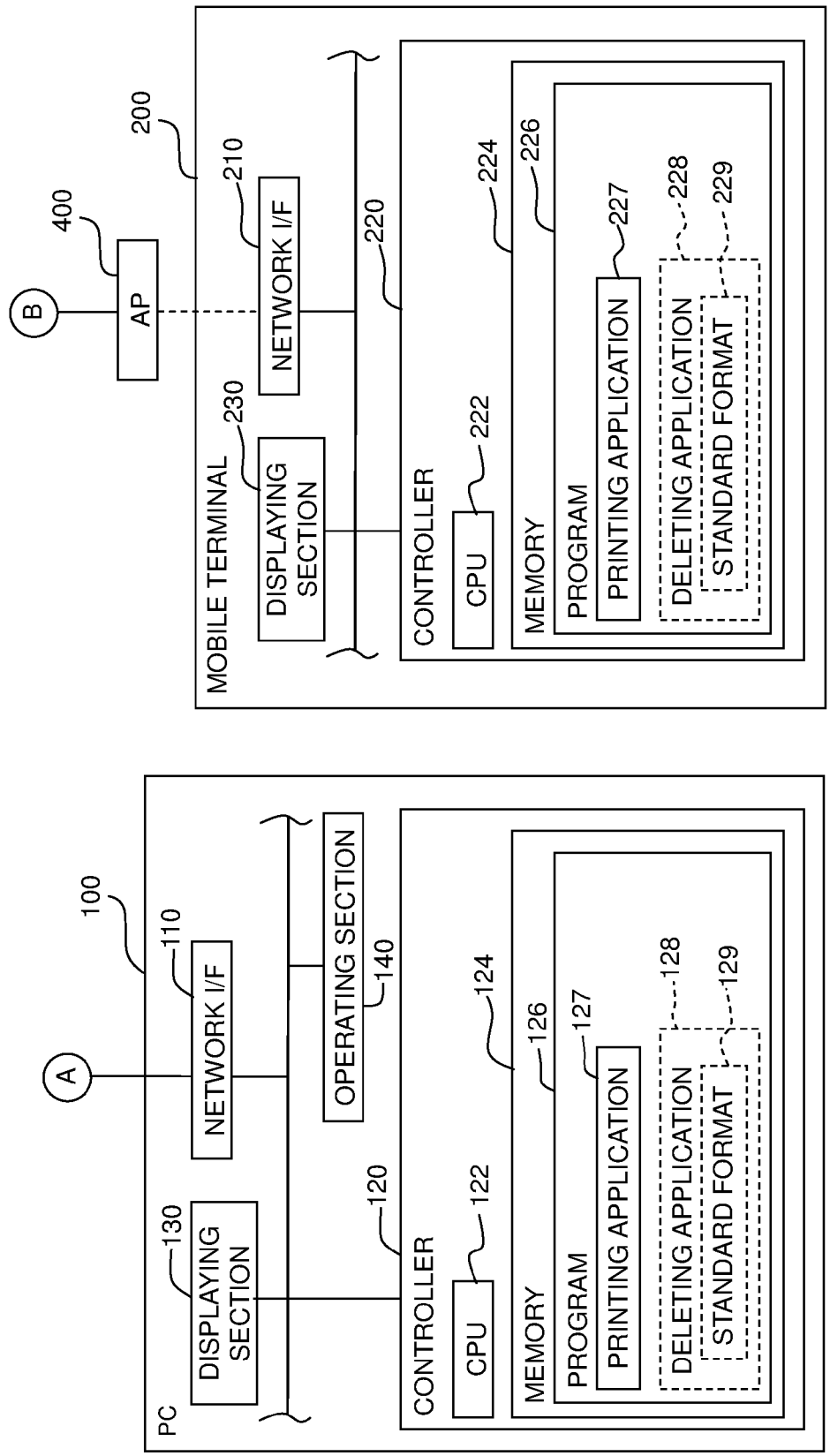

With reference to FIGS. 1A and 1B, an explanation will be given about the configuration of a printing system 2. The printing system 2 includes a PC 100, a mobile terminal 200, a printer 300 and Access Point (AP) 400. The PC 100, the printer 300 and the AP 400 belong to a same local area network (LAN) 5. Further, the mobile terminal 200 belongs to the LAN 5 by wirelessly connecting to the AP 400. Accordingly, the PC 100 can communicate with the mobile terminal 200 and the printer 300 via the LAN 5, without via the Internet. Similarly, the mobile terminal 200 also can communicate with the PC 100 and the printer 300 via the LAN 5, without via the Internet. Note that although FIG. 1B depicts the PC 100 and the mobile terminal 200 each as one unit, actually a plurality of pieces of each of the PC 100 and the mobile terminal 200 are connectable. Here, the configuration depicted in FIGS. 1A and 1B with a dotted rectangle does not appear in the configuration of the first embodiment, and thus the explanation therefor will be described in a second embodiment to be described later on.

<Configuration of PC 100>

The PC 100 is a terminal usable by a user for causing the printer 300 to print an image data. The PC 100 is provided with a network interface (network I/F) 110, a controller 120, a displaying section 130, and an operating section 140. The network I/F 110 is an interface for transmitting and receiving a signal via a network such as the LAN, Internet, etc.

The controller 120 is provided with a CPU 122 and a memory 124. A program 126 is stored in the memory 124. The memory 124 is, for example, a RAM, a ROM, a HDD, etc. The CPU 122 executes a various kinds of operations (processings) in accordance with the program 126 stored in the memory 124. Note that the program 126 includes a printing application 127 for printing a print data (to be described in detail later on). Note that in the second embodiment (to be described later on), the memory 124 stores a deleting application 128 and a standard format 129 which are included in the program 126 depicted in FIG. 1B. However, the deleting application 128 and the standard format 129 are not used (do not appear) in the configuration of the first embodiment, and thus the deleting application 128 and the standard format 129 will be explained in relation to the second embodiment which will be described later on.

The displaying section 130 is a display configured to display a various kinds of information. The operating section 140 is provided with a keyboard and a mouse. The user can input a various kinds of instructions to the PC 100 by operating the operating section 140.

<Configuration of Mobile Terminal 200>

The mobile terminal 200 is a terminal usable by the user for causing the printer 300 to print an image data, similarly to the PC 100. The mobile terminal 200 is provided with a network I/F 210, a controller 220 and a displaying section 230. The network I/F 210 is an interface for transmitting and receiving a signal via a network such as the LAN, Internet, etc., and is an interface for wireless connection to an external apparatus or device.

The controller 220 is provided with a CPU 222 and a memory 224. A program 226 is stored in the memory 224. The memory 224 is, for example, a RAM, a ROM, a HDD, etc. The CPU 222 executes a various kinds of operations (processings) in accordance with the program 226 stored in the memory 224. Note that the program 226 includes a printing application 227 for printing a print data (to be described in detail later on). Note that in the second embodiment (to be described later on), the memory 224 stores a deleting application 228 and a standard format 229 which are included in the program 226 depicted in FIG. 1B. However, the deleting application 228 and the standard format 229 are not used (do not appear) in the configuration of the first embodiment, and thus the deleting application 228 and the standard format 229 will be explained in relation to the second embodiment which will be described later on.

The displaying section 230 is a display configured to display a various kinds of information. Note that the displaying section 230 functions also as a touch panel configured to receive (accept) an operation by the user.

<Configuration of Printer 300>

The printer 300 is a laser printer. The printer 300 is provided with a network I/F 310, a controller 320, a displaying section 330, an operating section 340, and a print executing section 350. The network I/F 310 is an interface for transmitting and receiving a signal via a network such as the LAN, Internet, etc.

The controller 320 is provided with a CPU 322 and a memory 324. A program 326, a job table 327, a printer screen data 328, and a terminal screen data 329 are stored in the memory 324. The memory 324 is, for example, a RAM, a ROM, a HDD, etc. The CPU 322 executes a various kinds of operations (processings) in accordance with the program 326 stored in the memory 324.

The job table 327 stores a job ID, a user name, a file name, and a Personal Identification Number code (PIN code). The job ID is identification information which is unique to a job generated in accordance with a request from the PC and by which the job is identified. The user name is identification information for identifying the user operating the PC from which the request is transmitted. The file name is identification information for identifying a print data based on an image data associated with the job. The PIN code is authentication information which is utilized when a print data is to be printed, and which is composed, for example, of a four-digit number. Note that in the second embodiment (to be described later on), a protocol name is stored in the job table 327. The protocol name, however, does not appear in the configuration of the first embodiment, and thus the explanation therefor will be given in relation to the second embodiment.

As will be explained in detail later on, the printer 300 is capable of executing a secure printing. The secure printing is a printing method wherein an input of a PIN code associated to a print data from the user via the displaying section 330 and the operating section 340 is received; and under a condition that the inputted PIN code matches a PIN code stored in the job table 327, the print data associated with the matched PIN code is printed. Note that the job table 327 depicted in FIG. 1A indicates a state that two jobs are already registered.

The printer screen data 328 is a page data indicating a screen which is displayed in the displaying section 330 of the printer 300 for executing the secure printing. The printer screen data 328 includes a job list screen and a PIN code input screen (to be described later on).

The terminal screen data 329 is a page data indicating a screen displayed in the displaying section 130 of the PC 100 or the displaying section 230 of the mobile terminal 200. Specifically, the printer 300 is capable of functioning as a web server, and is capable of transmitting the terminal screen data 329 which is a web page data having a Hyper Text Markup Language (HTML) format to the PC 100 and the mobile terminal 200, to thereby cause the displaying section of each of the PC 100 and the mobile terminal 200 to display a screen indicated by the terminal screen data 329. Note that a part of the image indicated by the terminal screen data 329 becomes displayable (visible) by a successful login to the printer 300 by the PC 100 and the mobile terminal 200.

The terminal screen data 329 includes a home screen data, a login screen data, a login-success screen data, a login-failure screen data, a deletion screen data, a delete-success screen data, and a delete-failure screen data (which will be described later on). Note that the home screen data, the login screen data, the delete-success screen data, and the delete-failure screen data are stored in advance in the memory 329 as the terminal screen data 329. The login-success screen data and the login-failure screen data are generated in response respectively to the occurrences of successful login and failed login by the PC 100, etc. to the printer 300 (to be described in detail later on). The deletion screen data is generated in response to reception, by the printer 300, of a deletion screen obtaining request from the PC 100, etc. (to be described in detail later on).

The displaying section 330 is a display configured to display a various kinds of information thereon. Note that the displaying section 330 functions also as a touch panel for receiving (accepting) an operation from the user. The operating section 340 is provided with a plurality of keys. The user can input a various kinds of instructions to the printer 300 by operating the displaying section 330 and/or the operating section 340. The print executing section 350 executes a processing for printing an externally obtained data on a recording medium by a known electro-photographic system.

<Operation of Printing System 2> (Data Storage Processing)

Figure 2B:
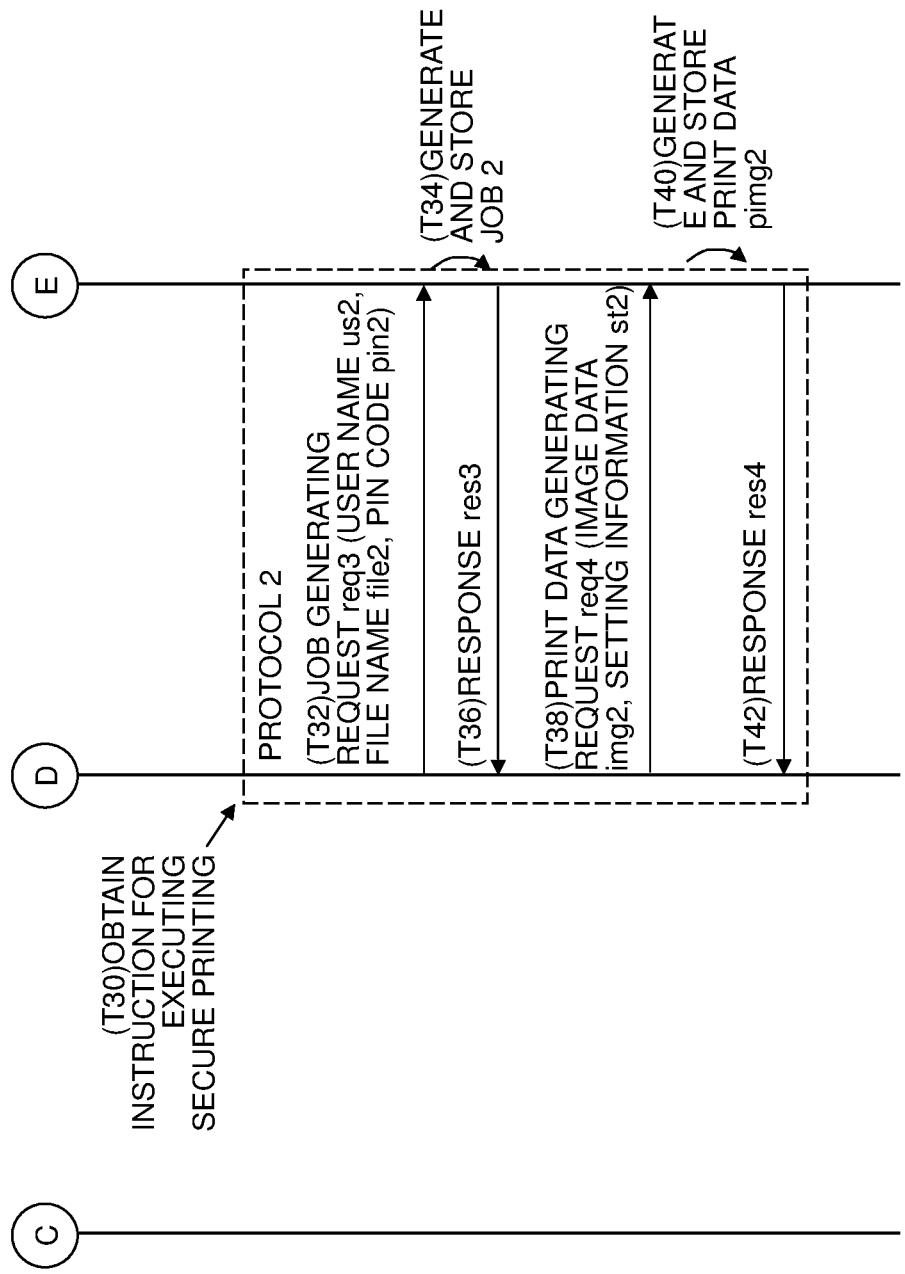

With reference to FIGS. 2A and 2B, a data storage processing executed by the printing system 2 will be explained.

In a case that a secure printing is desired by a user, at first, the printing system 2 executes the data storage processing including the processings of steps T10 to T22 in response to the user's operation of the PC 100. Here, the secure printing is a printing method for executing printing under a condition that the PIN code is inputted to the printer 300, as described above. Specifically, in a case that the printer 300 receives the PIN code and an image data from the PC 100, the printer 300 does not immediately print the image data, and in a case that the PIN code is inputted by the user, the printer 300 prints the image data associated with the PIN code inputted by the user.

In step T10, the PC 100 receives (accepts), from the user, an execution instruction for executing the secure printing. Specifically, at first, the PC 100 activates the printing application 127, triggered by the user's selection of printing of an image data img1 with an image browsing application (not depicted in the drawings) included in the program 126, and the PC 100 causes the displaying section 130 to display a print setting screen.

The print setting screen is a screen for allowing the user to make settings for the printing of the image data img1. The PC 100 obtains setting information st1 composed of a number of copies to be printed, a setting regarding double-sided printing and a sheet size for the image data img1, based on input made by the user in the print setting screen. Further, the PC 100 obtains a user name us1 and a PIN code pin1 for executing the secure printing for the image img1, based on the input made by the user in the print setting screen. Note that it is allowable to designate the user name us1 by using a user name used during the login to the PC 100 by the user when the PC 100 has been activated, rather than the user name specified with the input by the user.

In step T12, the PC 100 transmits a job generating request req1 to the printer 300, in accordance with a protocol 1. The protocol 1 is, for example, Web Service on Devices (WSD).

The job generating request req1 is a request for causing the printer 300 to generate a print job for a print data pimg1 based on the image data img1. The job generating request req1 includes a file name file1 as the file name of the image data img1, and the user name us1 obtained in step T10. Note that in steps T12 to T22, the PC 100 and the printer 300 communicate with each other in accordance with the protocol 1.

In step T14, the printer 300 generates a job 1 based on the job generating request 1. The job 1 includes the user name us1 and the file name file1. After the printer 300 has generated the job 1, the printer 300 imparts a job ID jb1 to the job 1; and the printer 300 stores, in the job table 327, the job ID jb1, the user name us1 and the file name file1 as the job 1 in which the job ID jb1, the user name us1 and the file name file1 are associated to one another.

In step T16, the printer 300 transmits a response res1 to the PC 100, in accordance with the protocol 1. The response res1 is a response with respect to the job generating request req1, and indicates that the job 1 has been generated successfully.

In step T18, the PC 100 transmits a print data generating request req2 to the printer 300 in accordance with the protocol 1. The print data generating request req2 is a request for causing the printer 300 to generate a print data based on the setting information st1 obtained in the step T10. The print data generating request req2 includes the image data img1, the setting information st1 and the PIN code pin1.

In step T20, the printer 300 generates a print data based on the print data generating request req2. Specifically, the printer 300 generates, from the image data img1, a RGB output data in which RGB value in a range of 0 to 255 is imparted to each of pixels. Note that the printer 300 generates the RGB output data based on the setting information st1. Next, the printer 300 executes a color conversion processing for converting the RGB value, of each of the pixels contained in the RGB output data, into a CMYK value. With this, a CMYK output data in which a CMYK value in a range of 0 to 255 is imparted to each of pixels is generated. Next, the printer 300 executes a binarization processing for the CMYK output data. As the binarization processing, for example, the dithering method, the error diffusion method, etc. is used. This generates print data pimg1 in which each of the pixels has a two-gradation pixel value that is 1 or 0. Note that "1" indicates that a dot is formed on a recording medium, and "0" indicates that no dot is formed on the recording medium. The printer 300 stores the generated print data pimg1 in the memory 324, while associating the generated print data pimg1 with the job ID jb1.

Further, the printer 300 stores the PIN code pin1 in the job table 327 while associating the PIN code pin1 with the job ID jb1. By doing so, the print data pimg1 and the job 1 (the job ID jb1, user name us1, file name file1, and PIN code pin1) are stored in the memory 324 while being associated with each other.

In step T22, the printer 300 transmits a response res2 to the PC 100, in accordance with the protocol 1. The response res2 is a response with respect to the print data generating request req2 and indicates that the print data pimg1 has been generated successfully.

Steps T30 to T42 indicate a case that a user, different from the user operating the PC 100, operates the mobile terminal 200 to instruct the printer 300 to execute the secure printing, at a different timing from the timing at step T10.

In steps T30 to T42, the mobile terminal 200 transmits, to the printer 300, a job generating request req3 and a print data generating request req4 in a similar manner as those in steps T10 to T22, which in turn causes the printer 300 to generate a job 2 and a print data pimg2, and to store the generated job 2 and print data pimg2 in the memory 324 while associating the generated job 2 and print data pimg2 with a job ID jb2.

The PC 100 transmits, in step T12, the job generating request req1 including the user name us1 and the file name file1 to the printer 300, and the PC transmits, in step T18, the print data generating request req2 including the image data img1, the setting information st1 and the PIN code pin1 to the printer 300. On the other hand, the mobile terminal 200 transmits, in step T32, a job generating request req3 for generating the job 2 including a user name us2, a file name file2, and a PIN code pin2 in accordance with a protocol 2 (for example, Internet Printing Protocol (IPP)) which is different from the protocol 1, to the printer 300. Further, the mobile terminal 200 transmits, in step T38, a print data generating request req4 including an image data img2 and setting information st2, to the printer 300. Namely, it is allowable that the PIN code is contained in either one of the job generating request and the print data generating request.

With this, the print data pimg2 and the job 2 (the job ID jb2, user name us2, file name file2, and PIN code pin2) are stored in the memory 324 while being associated with each other. Note that in steps T32 to T42, the mobile terminal 200 and the printer 300 communicate with each other in accordance with the protocol 2.

Note that in the embodiment as described above, each of the PC 100 and the mobile terminal 200 transmits the job generating request and the print data generating request separately to the printer 300. Instead of doing so, however, it is allowable that each of the PC 100 and the mobile terminal 200 transmits one generating request in which the job generating request and the print data generating request are combined (bundled). In this case, the generating request includes the user name, the file name, the PIN code, the image data and the setting information. After the printer 300 receives the generating request, the printer 300 stores, in the job table 327, the user name, the file name and the PIN code while associating the user name, the file name and the PIN code with the job ID. Further, the printer 300 generates a print data based on the image data and the setting information, and stores the generated print data in the memory 324 while associating the print data with the job ID. With this, the print data and the job are stored in the memory 324 while being associated with each other.

In the above-described manner, the two jobs are registered in the job table 327 as depicted in FIG. 1A. Note that these requests may be executed with respect to the printer 300 by another terminal apparatus or unit different from the PC 100 and the mobile terminal 200. Note that although the jobs registered by the print instructions from different users, respectively, are indicated in the job table 327 depicted in FIG. 1A by way of example, in a case that a same user (for example, the user name us1) issues another print instruction, a job different from the job 1 (for example, a job 3) is further registered in the job table 327 while being associated with the user name us1.

(Data Print Processing)

Next, an explanation will be given about a data print processing executed by the printer 300, with reference to FIG. 3. The data print processing is a processing for printing a print data of a job generated and stored by the data storage processing.

The printer 300 starts the data print processing under a condition that the printer 300 receives, form a user, an operation of selecting a button, for the execution of secure printing, which is displayed in the displaying section 330.

In step S110, the CPU 322 causes the displaying section 330 to display a job list screen, and receives a selection of a job to be executed. The job list screen includes a list of all the file names of the jobs stored in the job table 327, boxes each for selecting one of the stored jobs for of which execution is instructed, an execution button for instructing the execution of the job, and a stop button for stopping the job selection for the secure printing. Note that in the present embodiment, although the job list screen displays the list of the file names of all the jobs stored in the job table 327, regardless of the user name, there is no limitation to this. It is allowable, for example, in a case that the user name is inputted by a login operation to the printer 300, etc., before selecting the button for executing the secure printing, job(s) associated with the inputted user name is (are) extracted from the job table 327 and is displayed in the job list screen.

In step S112, the CPU 322 determines whether or not a job is selected in the job list screen, and whether or not execution of the selected job is instructed. The CPU 322 determines that no job is selected (S112: NO) in a case that the execution button is not depressed in the job list screen, or that the execution button is depressed in a state that any box for selecting the job is not selected, and the CPU 322 executes the processing of step S110. On the other hand, the CPU 322 determines that the job is selected (S112: YES) in a case that the execution button is depressed in a state that a box for selecting the job is selected, and the CPU 322 executes the processing of step S114. Note that the CPU 322 ends the data print processing in a case that the stop button is depressed (not depicted in the drawings).

In step S114, the CPU 322 displays a PIN code input screen for executing a job selected in the job list screen (hereinafter referred to as "print job"), and receives (accepts) input of the PIN code. The PIN code input screen includes a box for inputting the PIN code, an instruction button for instructing the authentication of the PIN code, and a stop button for stopping the authentication of the PIN code.

In step S116, the CPU 332 determines whether or not the PIN code inputted in the PIN code input screen matches the PIN code associated with the print job. The CPU 322 executes the authentication of the PIN code, in response to the input of the PIN code to the box for inputting the PIN code thereto, and the depression of the button for instructing the authentication. Specifically, the CPU 322 determines whether or not the inputted PIN code matches the PIN code stored in the job table 327 while being associated with the print job.

In a case that the inputted PIN code does not match the PIN code associated with the print job (S116: NO), the CPU 322 executes the processing of step S114. On the other hand, in a case that the inputted PIN code matches the PIN code associated with the print job (S116: YES), the CPU 322 executes the processing of step S118. Note that in a case that the stop button is depressed (not depicted in the drawings), the CPU 322 executes the processing of step S110, and again receives the job selection.

In step S118, the CPU 322 prints a print data associated with the print job. Here, the CPU 322 uses a print executing section 350 so as to print the print data on a recording medium, based on the setting information included in the print request at the time when the print job has been generated.

In step S120, the CPU 322 deletes the print job. Specifically, the CPU 322 deletes the job ID, the user name, the file name and the PIN code, which are associated with the print job, from the job table 327. Further, the CPU 322 deletes the print data associated with the job ID of the print job, from the memory 324. In response to the completion of the processing of step S120, the data print processing is ended.

(Data Deletion Processing)

Next, an explanation will be given about a data deletion processing executed by the printing system 2, with reference to FIGS. 4A and 4B. The data deletion processing is a processing for deleting a job generated and stored by the data storage processing. In the embodiment, although the data deletion processing is explained after the explanation of the data print processing, the execution sequence of the data print processing and the data deletion processing is not limited to this. The data deletion processing may be executed after the execution of data print processing, or may be executed before the execution of data print processing. Namely, the printer 300 is capable of executing deletion of a certain print data, regardless of the printing of a specific print data which is different from the certain data.

The data deletion processing is started in a case that the user issues an instruction to login to the printer 300 via the PC 100. Specifically, at first, the user operates the operating section 140 of the PC 100 so as to activate a web browser (not depicted in the drawings) included in the program 126. Further, the user inputs, in the web browser, an IP address of the printer 300 to an address bar for specifying the address. The PC 100 makes access to the printer 300 in accordance with the inputted IP address, and obtains a home screen data included in the terminal screen data 329. The user depresses a login button in a home screen indicated by the home screen data and displayed in the PC 100. With this, the data deletion processing is started. Note that in the present embodiment, it is assumed that the combination of the user name us1 and a password psi for allowing the user corresponding to the user name us1 to login to the printer 300, via the PC 100, etc., is stored in the memory 324 of the printer 300 in advance.

In step T210, the PC 100 transmits a login screen obtaining request req11 to the printer 300. The login screen obtaining request req11 is a request for allowing the PC 100 to obtain a login screen for login to the printer 300.

In step T212, the printer 300 transmits, to the PC 100, a response res11 with respect to the login screen obtaining request req11. The response res11 includes the login screen data included in the terminal screen data 329.

In step T214, the PC 100 displays the login screen in the displaying section 130, based on the login screen data. The login screen includes a box for inputting the user name, a box for inputting a password, and a button for executing the login.

In step T215, the PC 100 receives inputs of the user name and the password by the user. The PC 100 obtains, in the login screen, the user name us1, the password psw1 and a login execution instruction in response to depressing of the button for instructing the login after the user name us1 has been inputted to the box for inputting the user name, and the password psw1 has been inputted to the box for inputting the password.

In step T216, the PC 100 transmits a login request req12 to the printer 300. The login request req12 is a request for allowing the PC 100 to login to the printer 300. The login request req12 includes the user name us1 and the password pw1 which have been inputted in step T215.

In step T218, the printer 300 determines whether or not the login of the PC 100 has been successful. Specifically, the printer 300 determines whether or not the combination of the user name us1 and the password pw1 included in the login request req12 has been stored in the memory 324 in advance. Here, since the combination of the user name us1 and the password pw1 has been stored in the memory 324 in advance, the printer 300 determines that the login of the PC 100 has been successful (T218: YES), and executes the processing of step T220.

In step T220, the printer 300 generates a login-success screen data included in the terminal screen data 329. The login-success screen data indicates that the login of the PC 100 (to the printer 300) has been successful.

In step T224, the printer 300 transmits, to the PC 100, a response res12 with respect to the login request req12. The response res12 includes the login-success screen data indicating that the login of the PC 100 to the printer 300 has been successful.

In step T226, the PC 100 displays the login-success screen, based on the login-success screen data received from the printer 300, in the displaying section 130.

Note that in step T218, in a case that the combination of the user name us1 and the password pw1 included in the login request req12 has not been stored in the memory 324 in advance, the printer 300 determines that the login of the PC 100 (to the printer 300) has failed (T218: NO), and executes the processing of step T222.

In step T222, the printer 300 generates a login-failure screen data included in the terminal screen data 329. The login-failure screen data indicates that the login of the PC 100 (to the printer 300) has failed. Further, the response res12 transmitted in step T214 includes the login-failure screen data for displaying the login-failure screen indicating that the login of the PC 100 to the printer 300 has failed. Note that the login-failure screen may be a screen for receiving the input of the user name and the input of the password again. In such a case, the login-failure screen includes a box for inputting the user name, a box for inputting the password, and a button for executing the login, similarly to the login screen.

The following explanation will be made on the premise that the PC 100 displays the login-success screen.

In step T227, the PC 100 receives a deletion screen obtaining instruction from the user (issued by the user). In response to the selection made by the user, in the login-success screen, so as to select a button for obtaining a deletion screen SC1 for deleting the job stored in the job table 327 of the printer 300, the PC 100 executes the processing of step T228.

In step T228, the PC 100 transmits a deletion screen obtaining request req14 to the printer 300.

In step T230, the printer 300 generates a deletion screen data included in the terminal screen data 329. The deletion screen data is a screen data indicating the deletion screen SC1. The printer 300 generates the deletion screen data by extracting the job 1 and the job 2 as all the jobs stored in the job table 327. Note that in order to display the file names of the extracted jobs in the deletion screen SC1, the deletion screen data includes the file name file1 and the file name file 2. Although not displayed in the deletion screen SC1, the job ID jb1 and the job ID jb2 corresponding to the extracted jobs are also included in the deletion screen data. With this, the user can instruct object data to be deleted based on the file names file1 and file2 included in the deletion screen SC1 displayed by the PC 100. Note that it is allowable to generate the deletion screen data by extracting only the job(s) which is (are) included in the jobs stored in the job table 327 and which is (are) stored while being associated with the user name us1 inputted at the time of the login.

In step T232, the printer 300 transmits a response res14 to the PC 100. The response res 14 is a response with respect to the deletion screen obtaining request req14, and includes the deletion screen data generated in step T230. With this, the printer 100 can display the deletion screen SC1 including the file name(s), even if the PC 100 does not store the file name(s) included in the print request transmitted to the printer 300.

In step T234, the PC 100 displays the deletion screen SC1 in the displaying section 130. As described above, the deletion screen SC1 is a screen via which the job 1 and the job 2 stored in the job table 327 of the printer 300 can be deleted.

Figure 5:
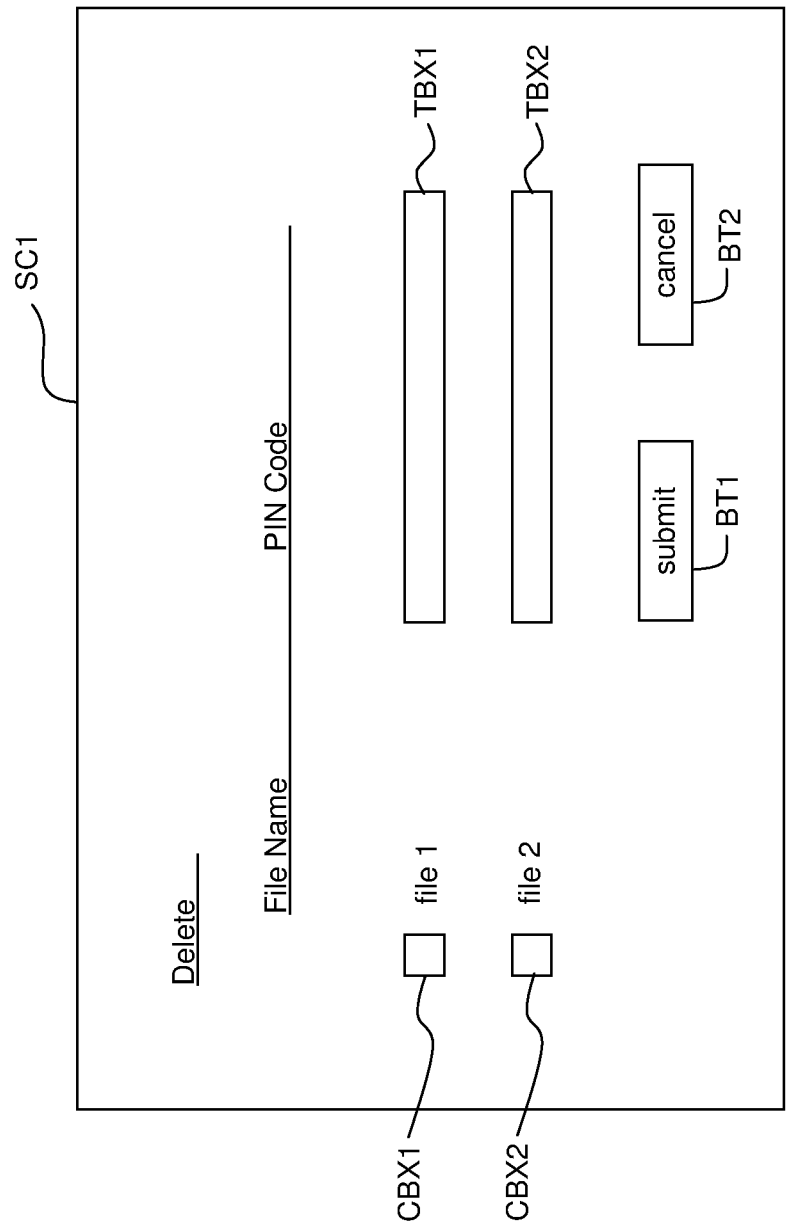
FIG. 5 is a view depicting a deletion screen.

As depicted in FIG. 5, a checkbox CBX1 in the deletion screen SC1 is a box for selecting the job 1. The user can select the job 1 by checking the checkbox CBX1 on (by entering a check to the checkbox CBX1) based on the file name file1 indicated next to the checkbox CBX1. Further, under a condition that the checkbox CBX1 is checked on, a textbox TBX1 is transformed from being in a display state in which the textbox TBX1 is input-disabled to a display state in which the textbox TBX1 is input-enabled. The textbox TBX1 is a box for inputting the PIN code of the job 1. As described above, the printer 300 receives the input of the PIN code by the user so as to print the print data corresponding to the job. Accordingly, the printer 300 is required to receive the input of the PIN code by the user also in a case that the job is to be deleted.

A checkbox CBX2 is a checkbox for selecting the job 2. A textbox TBX2 is a box for inputting the PIN code of the job 2. Under a condition that the checkbox CBX2 is checked on, the textbox TBX2 is transformed from being in a display state in which the textbox TBX2 is input-disabled to a display state in which the textbox TBX2 is input-enabled, similarly to the textbox TBX1. A button BT1 is a button for instructing the deletion of the selected job(s) to the printer 300. A button BT2 is a button for stopping (cancelling, aborting) the selection of the job(s) to be deleted.

Returning to FIG. 4B, in step T236, the PC 100 receives the selection of a job and the input of a PIN code by the user. In the deletion screen SC1 displayed in the displaying section 130 of the PC 100, the user enters a check to a check box corresponding to a job which the user wishes to delete, inputs the PIN code of the selected job in the text box corresponding to the selected job, and then depresses the button BT1. The PC 100 obtains the inputted PIN code, and specifies the job ID corresponding to the job based on the check entered in the checkbox. In the following, an explanation will be given about a case that the user instructs the deletion of the job 1. Namely, in the deletion screen SC1, the user depresses the button BT1 in a state that the checkbox CBX1 is checked on and the PIN code pin1 is inputted in the textbox TBX1. In this situation, the PC 100 obtains the PIN code pin1 and specifies the job ID jb1, as well.

In step T238, the PC 100 transmits a job deleting request req15 to the printer 300. The job deleting request req15 is a request for causing the printer 300 to delete the job 1 of which deletion is instructed by the user. The job deleting request req15 includes the job ID jb1 specified and the PIN code pin1 obtained by the input made by the user in step T236.

In step T240, the printer 300 determines whether or not the PIN code included in the job deleting request req15 matches the PIN code corresponding to the job of which deletion is requested by the user. Specifically, the printer 300 specifies that the job of which deletion is requested by the user is the job 1, based on the job ID jb1 included in the job deleting request req15. The printer 300 determines whether or not the PIN code included in the job deleting request req15 matches the PIN code corresponding to the job 1. Here, since each of the PIN code included in the job deleting request req15 and the PIN code corresponding to the job 1 is the PIN code pin1, the printer 300 determines that the PIN codes match to each other (T240: YES), and the printer 300 executes the processing of T242.

In step T242, the printer 300 deletes the job 1. Specifically, the printer 300 deletes, from the job table 327, the job ID jb1, the user name us1, the file name file1 and the PIN code pin1. Further, the printer 300 deletes the print data pimg1 associated with the job ID jb1 of the job 1 from the memory 324.

In step T244, the printer 300 transmits, to the PC 100, a response res15 with respect to the job deleting request req15. The response res15 includes a delete-success screen data included in the terminal screen data 329. The delete-success screen data is a screen data for displaying a delete-success screen for indicating the deletion of the job 1, of which deletion has been specified by the user, has been successful.

In step T246, the PC 100 displays the delete-success screen, based on the delete-success screen data received from the printer 300, in the displaying section 130.

Note that in step T240, in a case that the PIN code included in the job deletion request req15 does not match the PIN code corresponding to the job of which deletion has been specified by the user (T240: NO), the printer 300 executes the processing of step T244, without executing the processing of T242. In this case, the response res15 transmitted in step T244 includes a delete-failure screen data included in the terminal screen data 329. The delete-failure screen data is a screen data for displaying a delete-failure screen indicating that the deletion of the job of which deletion was specified by the user has been failed. Further, in step T246, the PC 100 displays the delete-failure screen in the displaying section 130. Note that the deletion-failure screen may be a screen for receiving (accepting) the PIN code, corresponding to the job of which deletion has been failed, again. In such a case, the delete-failure screen includes a box for inputting the PIN code, and a button for instructing the execution of login.

In response to the completion of the processing of step T246, the data deletion processing is ended. Note that in a case that the user instructs, via the deletion screen SC1, the execution of the deletion of both of the job 1 and the job 2, then the determination is to be made for each of the job 1 and the job 2 in step T240 as to whether the corresponding PIN codes match or not regarding each of the jobs 1 and 2. In such a case, for example, under the condition that the PIN codes match regarding each of the jobs 1 and 2, the printer 300 transmits the delete-success screen data to the PC 100; on the other hand, under a condition that the PIN codes does not match regarding at least one of the jobs 1 and 2, the printer 300 transmits the delete-failure screen data to the PC 100.

Note that although the user operates the PC 100 in this embodiment, it is allowable that the user operates the mobile terminal 200, instead of operating the PC 100, so as to execute the data deletion processing. In such a case, since the processings executed by the mobile terminal 200 are similar to those executed by the PC 100, any explanation therefor will be omitted.

As explained above, in the present embodiment, in a case that the PC 100 transmits the PIN code pin1 inputted in step T236 to the printer 300, the printer 300 deletes the print data pimg1 of the job 1 from the memory 324 under a condition that the PIN code pin1 received from the PC 100 matches the PIN code pin1 stored in the memory 324 while being associated with the job ID jb1. Namely, the user can delete the image data pimg1 from the memory 324, without going in front of the printer 300 and inputting the PIN code pin1 to the printer 300. Accordingly, it is possible to reduce the time and labor of the user in a case of deleting the print data pimg1 which is stored in the memory 324 while being associated with the PIN code pin1.

<Corresponding Relationship>

The PC 100 is an example of the "terminal apparatus". The printer 300 is an example of the "printing apparatus".

The print data pimg1 is an example of the "object data". The PIN code pin1 corresponding to the print data pimg1 is an example of the "associated authentication information". The PIN code inputted in step T236 of FIG. 4B is an example of the "first input authentication information", and the PIN code inputted in step S114 of FIG. 3 is an example of the "second input authentication information".

The operating section 140 of the PC 100 is an example of the "first inputting section". The operating section 340 of the printer 300 is an example of the "second inputting section". The print executing section 350 of the printer 300 is an example of the "printing section". The memory 324 of the printer 300 is an example of the "first memory" and is an example of the "memory". The CPU 122 of the PC 100 is an example of the "processor". The CPU 322 of the printer 300 is an example of the "processor".

The file name file1, file name file2 are an example of the "identification information". The displaying section 130 of the PC 100 is an example of the "display".

Second Embodiment

Next, an explanation will be given about a printing system 2 in a second embodiment, with reference to FIGS. 1A and 1B. The printing system 2 of the second embodiment is configured by adding the following configuration to the printing system 2 of the first embodiment. The other (remaining) configuration of the printing system 2 of the second embodiment is similar to that of the first embodiment, and thus any detailed explanation therefor will be omitted.

<Configuration of PC 100>

The PC 100 includes, in the program 126, a deleting application 128 for deleting a job. The deleting application 128 includes a standard format 129. The standard format 129 is a format for generating a screen displayed in the displaying section 130 by the deleting application 128 (to be described in detail later on).

<Configuration of Mobile Terminal 200>

The mobile terminal 200 includes, in the program 226, a deleting application 228 for deleting a job. The deleting application 228 includes a standard format 229. The standard format 229 is a format for generating a screen displayed in the displaying section 230 by the deleting application 228 (to be described in detail later on).

<Configuration of Printer 300>

The Printer 300 stores, in the job table 327, a protocol name while associating the protocol name with a job ID, a user name, a file name and a PIN code. The protocol name is identification information for identifying a communication protocol which is used when the printer 300 communicates with an external apparatus or device such as the PC 100 and/or the mobile terminal 200, etc.

<Operation of Printing System 2> (Data Storage Processing)

With reference to FIGS. 2A and 2B, a data storage processing executed by the printing system 2 of the second embodiment will be explained. In the data storage processing of the second embodiment, the printer 300 stores also the protocol name, unlike the data storage processing in the first embodiment. Specifically, the storage of the protocol name is executed in the following manner.

As described above, in step T12, the PC 100 transmits the job generating request req1 to the printer 300 in accordance with the protocol 1, based on the execution instruction for executing the secure printing which the PC has received in step T10.

In step T14, the printer 300 generates a job based on the job generating request req1. The job includes a user name us1, a file name file1 and a protocol name pro1. The protocol name pro1 is identification information for identifying the protocol 1 used when the PC 100 transmits the job generating request req1 to the printer 300. The printer 300 is allowed to specify (identify) the protocol name pro1, under a condition that the printer 300 receives, from the PC 100, the job generating request req1 in accordance with the protocol 1. When the printer 300 generates the job, the printer 300 imparts the job ID jb1 to the generated job, and the printer 300 stores, in the job table 327, the job ID jb1, the user name us1, the file name file1 and the protocol name pro1 while associating the job ID jb1, the user name us1, the file name file1 and the protocol name pro1 to one another.

Since steps T16 to T22 are similar to those in the first embodiment, any explanation therefor will be omitted. By the completion of the processings up to step T22, the print data pimg1, the user name us1, the file name file1, the PIN code pin1, and the protocol name pro1 are associated to one another in the memory 324 of the printer 300.

Further, in steps T30 to T42, the print data pimg2, the user name us2, the file name file2, the PIN code pin2, and the protocol name pro2 are associated to one another, in the memory 324 of the printer 300, in a similar manner in steps T10 to T22.

(Data Print Processing)

Since the data print processing of the second embodiment is same as the data print processing of the first embodiment, any explanation therefor is omitted.

(Data Deletion Processing)

An explanation will be given about a data deletion processing of the second embodiment, with reference to FIGS. 6A to 6C. The data deletion processing is started in a case that the user issues an instruction to activate the deleting program 228 in the screen of the displaying section 230 of the mobile terminal 200. Specifically, the user selects an icon of the deleting application 228 in the screen of the displaying section 230 of the mobile terminal 200. In response to this, the mobile terminal 200 activates the deleting program 228 so as to start the data deletion processing. Note that the mobile terminal 200 is made to be capable of performing communications in accordance with the protocol 1 and the protocol 2, respectively, by the deleting application 228.

In step T310, the mobile terminal 200 transmits, to the printer 300, a job list obtaining request req21 in accordance with the protocol 1. The job list obtaining request req12 is a request for obtaining a list of job(s) which is (are) generated and stored by a job generation request transmitted from an external apparatus or device to the printer 300 in accordance with the protocol 1.

In step T311, the printer 300 extracts a job list lst1. Specifically, the printer 300 extracts, as the job list, a list of the job ID(s) and the file name(s) of a job or jobs which is/are included in the jobs stored in the job table 327 and which is/are stored while being associated with the protocol name pro1 for specifying (identifying) the protocol 1. Accordingly, the printer 300 extracts, from the job table 327, the job ID jb1 of the job 1, the file name file1 and the protocol name pro1 as the job list lst1.

In step T312, the printer 300 transmits, to the mobile terminal 200, a response res21 with respect to the job list obtaining request req21 in accordance with the protocol 1. The response res21 includes the job list lst1 extracted in step T311.

In step T314, the mobile terminal 200 stores the received job list lst1 in the memory 224.

In steps T316 to T320, the mobile terminal 200 obtains a job list lst2 from the printer 300 and stores the obtained job list lst2 in the memory 224, in a similar manner as regarding steps T310 to T314. Note that in step T316, the mobile terminal 200 transmits, to the printer 300, a job list obtaining request req22 in accordance with the protocol 2. Accordingly, in step T317, the printer 300 extracts a job list lst2 composed of the job ID jb2 of the job 2 and the file name file2 which are stored in the job table 327 while being associated with the protocol name pro2, and the protocol name pro2. Further, in step T318, the printer 300 transmits, to the mobile terminal 200, a request res22 with respect to the job list obtaining request req22, in accordance with the protocol 2.

In step T322, the mobile terminal 200 generates a deletion screen data for displaying the deletion screen SC1 (see FIG. 5) based on the obtained job lists lst1 and lst2 and the standard format 229. Further, the mobile terminal 200 displays the deletion screen SC1, based on the generated deletion screen data, in the displaying section 230.

Among the items indicated in the deletion screen SC1, items different from the file names file1 and file2 can be displayed based on the standard format 229. The mobile terminal 200 adds, to the standard format 229, the file names file1 and file2 included in the obtained job lists lst1 and list2, respectively. With this, the file name file1 and the file name file2 become displayable in columns or fields for displaying the file names in the deletion screen SC1. According to this configuration, even if the mobile terminal 200 does not store the file name(s) included in the print request transmitted to the printer 300, the mobile terminal 200 is capable of displaying the deletion screen SC1 including the file name (s). Further, the mobile terminal 200 is capable of displaying the deletion screen SC1 based on the screen information generated by itself.

In step T324, the mobile terminal 200 receives the selection of job and the input of PIN code by the user. Since the processing of step T324 is similar to the processing of step T236 of FIG. 4B, any explanation therefor will be omitted. Note that in the following, an explanation will be given about a case that the deletion of the job 1 is instructed by the user. Accordingly, the mobile terminal 200 obtains the PIN code pin1, and specifies the job ID jb1.

In step T326, the mobile terminal 200 determines whether or not the protocol name associated with the specified job ID jb1 is the protocol name pro1. Specifically, the mobile terminal 200 extracts the protocol name(s) which is/are included in all the job lists stored in the memory 224, and which is/are associated with the job ID jb1. Here, since the protocol name pro1 is associated with the job ID jb1 (T326: YES), the mobile terminal 200 executes the processing of step T328.

In step T328, the mobile terminal 200 transmits, to the printer 300, a job deleting request req23 in accordance with the protocol 1 specified (identified) by the protocol name pro1. The job deleting request req23 includes the specified job ID jb1 and the PIN code pin1 obtained by the input made by the user.

In step T330, the printer 300 determines whether or not the PIN code included in the job deleting request req23 matches the PIN code corresponding to the job of which deletion is requested by the user. Specifically, the printer 300 specifies that the job of which deletion is requested by the user is the job 1, based on the job ID jb1 included in the job deleting request req23. The printer 300 determines whether or not the PIN code included in the job deleting request req23 matches the PIN code corresponding to the job 1. Here, since each of the PIN code included in the job deleting request req23 and the PIN code corresponding to the job 1 is the PIN code pin1, the printer 300 determines that the PIN codes match to each other (T330: YES), and the printer 300 executes the processing of step T332.

In step T332, the printer 300 deletes the job 1. Specifically, the printer 300 deletes, from the job table 327, the job ID jb1, the user name us1, the file name file1 and the PIN code pin1. Further, the printer 300 deletes the print data pimg1, which is associated with the job ID jb1 of the job 1, from the memory 324.

In step T334, the printer 300 transmits, to the mobile terminal 200, a response res23 with respect to the job deleting request req23. The response res23 includes information indicating that the deletion of the job 1, of which deletion was specified by the user, has been successful.

In step T336, the mobile terminal 200 determines whether or not the protocol name associated with the specified job ID jb1 is the protocol name pro2. As described above, since the job ID jb1 is associated with the protocol name pro1, but not associated with the protocol name pro2 (T336: NO), the mobile terminal 200 executes the processing of step T346.

In step T346, the mobile terminal 200 displays the delete-success screen, indicating that the deletion of the job has been successful, in the displaying section 230, in response to a situation that the information included in the response res23 indicates that the deletion of the job has been successful. In the present embodiment, the delete-success screen data for displaying the delete-success screen is included in the program 126 in advance, similarly to the standard format 129. Instead of the above configuration, however, the delete-success screen data may be generated by the mobile terminal 200 in response to the receipt of the response res23 by the mobile terminal 200. In response to the completion of the processing of step T346, the data deletion processing is ended.

Note that in step T330, in a case that the PIN code included in the job deletion request does not match the PIN code corresponding to the job of which deletion has been specified by the user (T330: NO), the printer 300 executes the processing of step T334, without executing the processing of step T332. In this case, the response res23 transmitted in step T334 includes information indicating that the deletion of the job, of which deletion was specified by the user, has failed. Further, in step T346, the mobile terminal 200 displays a delete-failure screen, indicating that the deletion of the job has failed, in the displaying section 230. In the present embodiment, the delete-failure screen data for displaying the delete-failure screen is included in the program 126 in advance. Instead of this configuration, however, the delete-failure screen data may be generated by mobile terminal 200 in response to the receipt of the response res23 by the mobile terminal 200. Note that the deletion-failure screen may be a screen for receiving (accepting) the PIN code, corresponding to the job of which deletion has been failed, again. In such a case, the delete-failure screen includes a box for inputting the PIN code, and a button for instructing the execution of login.

In the foregoing, the case that the deletion of the job 1 is instructed by user in step T324 has been explained. In the following, an explanation will be given about a case wherein the deletion of the job 2 is instructed by the user in step T324.

In step T324, the mobile terminal 200 receives the selection of job and the input of PIN code by the user. Here, it is assumed such a case that in the deletion screen SC1, the user depresses the button BT1 in a state that the checkbox CBX2 is checked on and the PIN code pin2 is inputted in the textbox TBX2. In this situation, the mobile terminal 200 obtains the PIN code pin2 and specifies the job ID jb2, as well.

In step T326, the mobile terminal 200 determines whether or not the protocol name associated with the specified job ID jb2 is the protocol name pro1. Here, since the protocol name pro1 is not associated with the job ID jb2 (T326: NO), the mobile terminal 200 executes the processing of step T336.

In step T336, the mobile terminal 200 determines whether or not the protocol name associated with the specified job ID jb2 is the protocol name pro2. Here, since the protocol name pro2 is associated with the job ID jb2 (T336: YES), the mobile terminal 200 executes the processing of step T338.

In step T338, the mobile terminal 200 transmits, to the printer 300, a job deleting request req24 in accordance with the protocol 2 specified by the protocol name pro2. The job deleting request req24 includes the job ID jb2 specified and the PIN code pin1 obtained by the input made by the user in step T324.

In step T340, the printer 300 determines whether or not the PIN code included in the job deleting request req24 matches the PIN code corresponding to the job of which deletion is requested by the user. Since the specific determining method in step T340 is similar to that in T330, any explanation therefor will be omitted. Here, since each of the PIN code included in the job deleting request req24 and the PIN code corresponding to the job 2 is the PIN code pin2, the printer 300 determines that the PIN codes match to each other (T340: YES), and the printer 300 executes the processing of step T342.

In step T342, the printer 300 deletes the job 2. Specifically, the printer 300 deletes, from the job table 327, the job ID jb2, the user name us2, the file name file2 and the PIN code pin2. Further, the printer 300 deletes the print data pimg2 associated with the job ID jb2 of the job 2 from the memory 324.

In step T344, the printer 300 transmits, to the mobile terminal 200, a response res24 with respect to the job deleting request req24. The response res24 includes information indicating that the deletion of the job2, of which deletion was specified by the user, has been successful.

In step T346, the mobile terminal 200 displays, in the displaying section 230, the delete-success screen indicating that the deletion of the job has been successful, in response to a situation that the information included in the response res24 indicates that the deletion of the job has been successful. In response to the completion of the processing of step T346, the data deletion processing is ended.

Note that in step T340, in a case that the PIN code included in the job deletion request req24 does not match the PIN code corresponding to the job of which deletion has been specified by the user (T340: NO), the printer 300 executes the processing of step T344, without executing the processing of step T342. In this case, the response res24 transmitted in step T344 includes information indicating that the deletion of the job, of which deletion was instructed by the user, has failed. Further, in step T346, the mobile terminal 200 displays, in the displaying section 230, the delete-failure screen.

In the foregoing, the case that the deletion of the job 2 is instructed by user in step T324 has been explained. Note that in a case that the deletion of both of the jobs 1 and 2 is instructed in the deletion screen SC1 by the user, then the processings from steps T326 to T344 are to be repeated by the number of the job of which deletion is instructed. In such a case, for example, in step T346, the mobile terminal 200 may cause the displaying section 230 to display the delete-success screen, under a condition that the mobile terminal 200 receives, in step T334 or T344, the information from the printer 300 indicating that the deletion has succeeded for each of the jobs; on the other hand, in step T346, the mobile terminal 200 may cause the displaying section 230 to display the delete-failure screen, under a condition that the mobile terminal 200 receives, in step T334 or T344, the information from the printer 300 indicating that the deletion has failed for at least one of the jobs.

Further, in a case that the deleting application 228 also supports a protocol(s) different from the protocol 1 and the protocol 2, the processings similar to those in steps T326 to T334, or in steps T336 to T344 are also executed before step T346 for all the protocol(s) which is (are) supported by the deleting application and which is (are) different from the protocols 1 and 2.

Note that in the present embodiment, the user operates the mobile terminal 200. It is allowable, however, that the data deletion processing is executed by operating the PC 100, rather than operating the mobile terminal 200. Since the processings executed by the PC 100 are similar to the processings executed by the mobile terminal 200, any explanation therefor will be omitted. Note that, however, the deletion screen data indicating the deletion screen SC1 is generated by the PC 100 based on the standard format 129 included in the deleting application 128 and the obtained job lists lst1 and lst2. The specific deleting method is similar to the method indicated in step T322.

As explained above, in the present embodiment, in a case that the mobile terminal 200 transmits the PIN code pin1 inputted in step T324 to the printer 300, the printer 300 deletes the print data pimg1 of the job 1 from the memory 324 under the condition that the PIN code pin1 received from the mobile terminal 200 matches the PIN code pin1 stored in the memory 324 while being associated with the job ID jb1. Namely, the user can delete the image data pimg1 from the memory 324 by inputting the PIN code pin1 in the mobile terminal 200, without going in front of the printer 300 and inputting the PIN code pin1 to the printer 300. Accordingly, it is possible to reduce the time and labor of the user in a case of deleting the print data pimg1 which is stored in the memory 324 while being associated with the PIN code pin1.

<Corresponding Relationship>

The mobile terminal 200 is an example of the "terminal apparatus" and the "first terminal apparatus". The PC 100 is an example of the "second terminal apparatus". The printer 300 is an example of the "printing apparatus".

The print data pimg1 is an example of the "object data". The PIN code pin1 corresponding to the print data pimg1 is an example of the "associated authentication information". The PIN code inputted in step T324 of FIG. 6B is an example of the "first input authentication information", and the PIN code inputted in step S114 of FIG. 3 is an example of the "second input authentication information".

The displaying section 230 of the mobile terminal 200 is an example of the "first inputting section" and is an example of the "display". The operating section 340 of the printer 300 is an example of the "second inputting section". The print executing section 350 of the printer 300 is an example of the "printing section".

The file name file1, file name file2 are an example of the "identification information".

The memory 324 of the printer 300 is an example of the "first memory" and is an example of the "memory". The memory 124 of the PC 100 and the memory 224 of the mobile terminal 200 are examples of the "second memory". The CPU 122 of the PC 100 and the CPU 222 of the mobile terminal 200 are examples of the "processor". The CPU 322 of the printer 300 is an example of the "processor".

In the foregoing, the specific examples of the present teaching have been explained in detail. These examples, however, are provided for the illustrative purposes only, and are not intended to limit or restrict the scope of the claims. The technique described in the scope of the claims includes various modifications, changes, etc., of the above-described embodiments, in various manners.

[Modification 1]

Figure 6A:
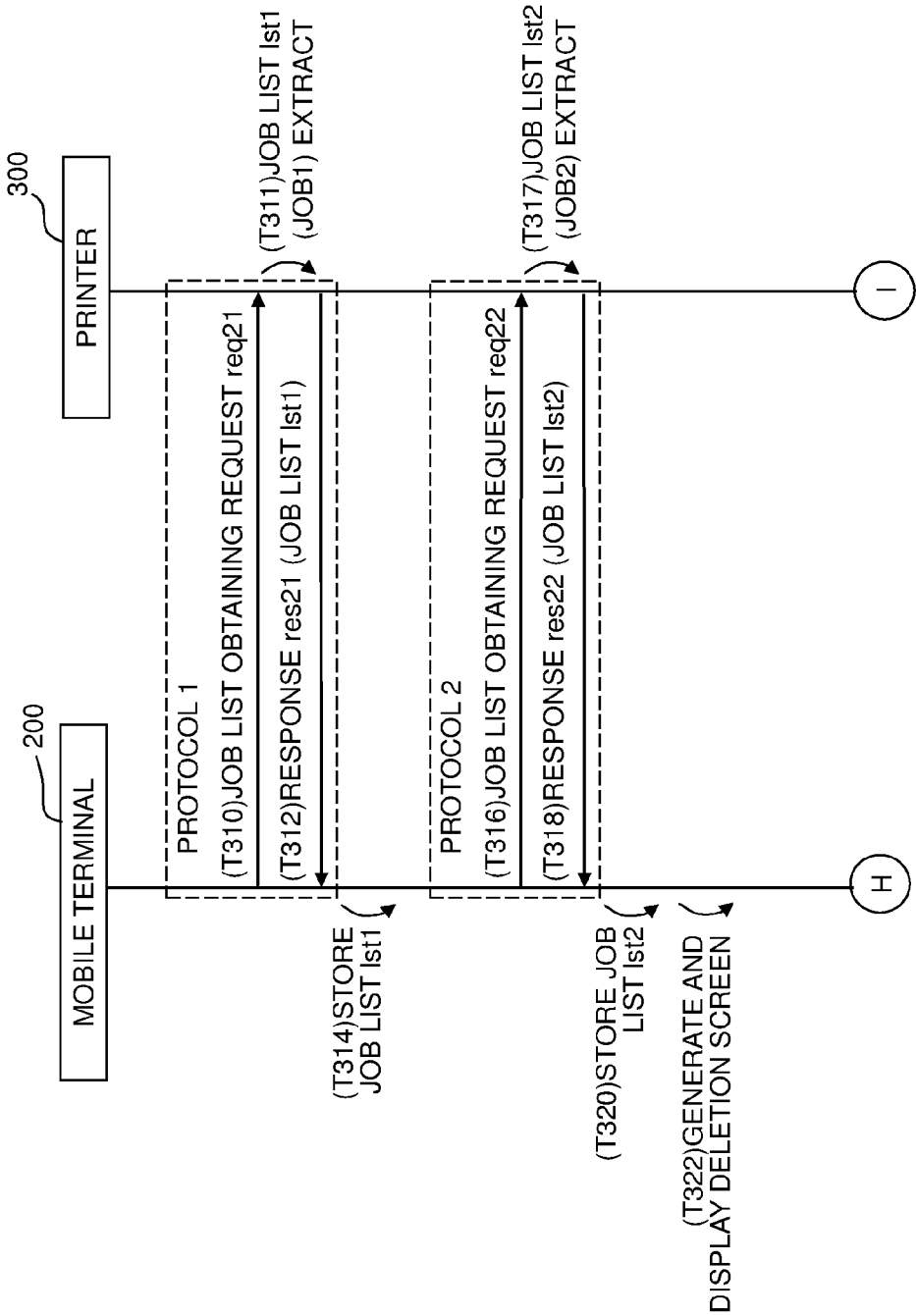

In the above-described first and second embodiments, the PC 100 and the mobile terminal 200 display, in step T234 of FIG. 4B and step T322 of FIG. 6A, respectively, the deletion screen SC1 including the check boxes each for selecting a job and text boxes each for inputting a PIN code. Instead of this configuration, however, each of the PC 100 and the mobile terminal 200 may display deletion screens for allowing the user to perform the job selection and the input of PIN code via separate screens, respectively. In this case, each of the PC 100 and the mobile terminal 200 displays, at first, a screen which includes the check boxes each for selecting a job but does not include text boxes each for inputting a PIN code. In a case that the user enters a check to a check box corresponding to a job which the user wishes to delete, and depresses a button for instructing the execution, then in response to this, each of the PC 100 and the mobile terminal 200 displays a screen including a text box for inputting the PIN code of the selected job. In general, the terminal apparatus may cause the displaying section to display a deletion screen for allowing the user to issue an instruction to delete an object data from the first memory.

[Modification 2]

In the above-described first and second embodiments, the printer 300 stores the job table 327 in the memory 324. Instead of this configuration, however, it is allowable that a memory inside an external server communicable with the printer 300 stores the job table 327. In this case, the printer 300 receives the job generating request req1 in step T12 of FIG. 2A, and in response to this, the printer 300 generates the job 1 in step T14. The printer 300 transmits the generated job 1 to the external server, and causes the memory in the external server to store the job 1. Further, the printer 300 receives the print data generating request req2 in step T18, and in response to this, the printer 300 generates the print data pimg1 in step T20. The printer 300 transmits the generated print data pimg1 to the external server, and causes the memory in the external server to store the print data pimg1. Furthermore, the printer 300 receives the job generating request req1 and the print data generating request req2, and in response to this, the printer 300 may transmit the job generating request req1 and the print data generating request req2 to the external server, and the external server may generate the job 1 and the print data pimg1, and may store the generated job 1 and print data pimg1 in the memory in the external server. Alternatively, an external memory such as a USB memory connected to the printer 300 may store the job table 327. In this case, the printer 300 may transmit the generated job 1 and print data pimg1 to the external memory, and may cause the external memory to store the job 1 and the print data pimg1. In general, the printing apparatus may store, in the first memory, the object data and the associated authentication information included in the print request, while associating the object data and the associated authentication information to each other.

[Modification 3]

In the above-described first embodiment, the PC 100 transmits the job deleting request req15 including the job ID and the PIN code to the printer 300 in step T238 of FIG. 4B. Instead of this configuration, however, it is allowable that the PC 100 transmits, to the printer 300, a job deleting request including the job ID, the PIN code and the user name operating the PC 100. For example, the user name included in this job deleting request is the user name us1 inputted during the login to the PC 100 in step T215. In this case, the printer 300 may determine, in step T240, whether or not the combination of the PIN code and the user name included in the job deleting request req15 matches the combination of the PIN code and the user name corresponding to the job of which deletion has been request by the user. In a case that the combination of the PIN code and the user name included in the job deleting request req15 matches the combination of the PIN code and the user name corresponding to the job of which deletion has been request by the user, the job is deleted. Accordingly, the user operating the PC 100 can delete only the job corresponding to the user. In other words, it is possible to prevent a certain user operating the PC 100 from deleting a job corresponding to another user different from the certain user.

Figure 6B:
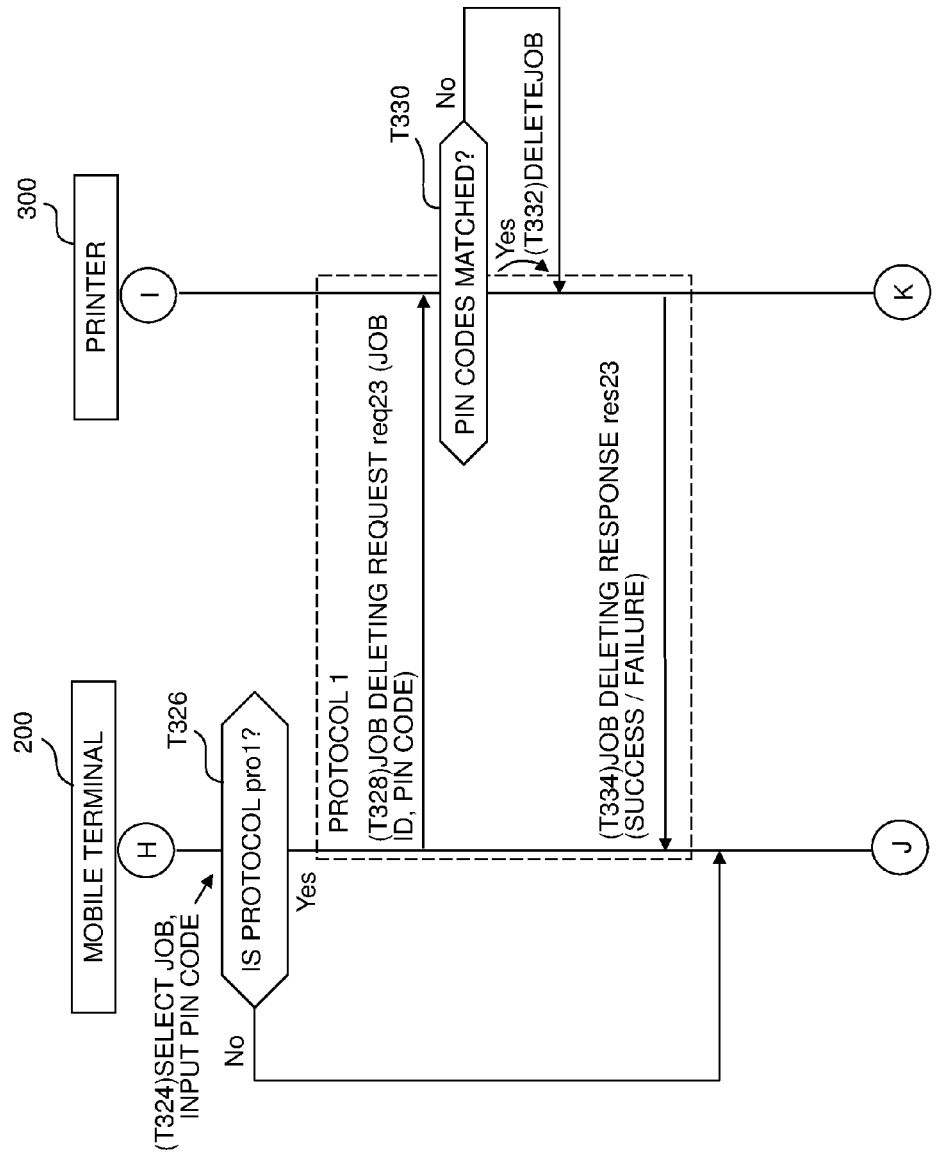

Further, in the above-described second embodiment, in steps T328 and T338 of FIGS. 6B and 6C, the mobile terminal 200 transmits, to the printer 300, the job deleting requests req23 and req24 each including the job ID and the PIN code. Instead of this configuration, however, the mobile terminal 200 may transmit, to the printer 300, a job deleting request including the job ID, the PIN code and the user name operating the mobile terminal 200, similarly to the PC 100 as the above-described modification 3. In this case, the mobile terminal 200 may receive the input of the user name, in addition to the selection of job and the input of PIN code by the user, for example in step T324 in order to obtain the user name included in the job deleting request. Further, the operation of the printer 300 in such a case is similar to that in the above-described modification 3. Accordingly, the user operating the mobile terminal 200 can delete only the job corresponding to the user. In other words, it is possible to prevent a certain user operating the mobile terminal 200 from deleting a job corresponding to another user different from the certain user.

[Modification 4]

In the above-described second embodiment, the mobile terminal 200 obtains the job lists from the printer 300 in steps T310 and T312, and in steps T316 and T318 of FIG. 6A, respectively. Instead of this configuration, however, the mobile terminal 200 may store the job list(s) in the memory 224 in advance. In this case, the mobile terminal 200 stores, in the memory 224, the user name us2, the file name file2 and the PIN code pin2 obtained in step T32 of FIG. 2B as the job list. Note that in a case that the mobile terminal 200 further obtains the executing instruction for executing the secure printing, the mobile terminal 200 adds the inputted user name, file name and PIN code to the job list, and stores the inputted user name, file name and PIN code added to the job list in the memory 224. Further, the mobile terminal 200 does not execute the steps T310 to T320 of FIG. 6A; rather, in step T322 of FIG. 6A, the mobile terminal 200 generates the deletion screen based on the job list stored in the memory 224, and displays the generated deletion screen. With this, consequently, the user issues, in the deletion screen, an instruction for deleting the job which is transmitted from the mobile terminal 200. Accordingly, for example, in a case that the mobile terminal 200 is a portable terminal which is assumed to be used only by the user, it is possible to ensure the security. Further, the above configuration may be provided also on the PC 100, in a similar manner regarding the mobile terminal 200. In general, the terminal apparatus may cause the displaying section to display a deletion screen for allowing the user to issue an instruction to delete an object data from the first memory.

[Modification 5]

In the mobile terminal 200 of the above-described second embodiment, the program 226 includes the printing application 227 and the deleting application 228. Namely, the mobile terminal 200 instructs the printing of print data and the deletion of job to the printer 300, by using different applications, respectively. Instead of this configuration, however, the mobile terminal 200 may have a program 226 including a multi-application which is provided with both of the functions of the printing application 227 and the deleting application 228 and which is capable of performing both of the printing of print data and the deletion of job. In this case, under a condition that the image data img1 is selected in step T30 of FIG. 2B, the mobile terminal 200 activates the multi-application, instead of the printing application 227, so as to display the print setting screen in the displaying section 130. Further, in FIG. 6A, the mobile terminal 200 starts the data deletion processing in response to the user's instruction to activate the multi-application in the screen of the displaying section 230 of the mobile terminal 200.

Further, the multi-application may be provided with the functions of the image browsing application, the printing application 227 and the deleting application 228. In such a situation, in a case that the user issues an instruction to execute the printing of the image data img1 by using the multi-application in step T30 of FIG. 2B, then the multi-application displays the print setting screen in the displaying section 130. Further, in FIG. 6A, the mobile terminal 200 starts the data deletion processing in response to the user's instruction to activate the multi-application in the screen of the displaying section 230 of the mobile terminal 200. Note that the deleting application in the second embodiment may be an example of the "computer program", or the multi-application of the above-described modification 5 may be an example of the "computer program".

[Modification 6]

In the above-described first and second embodiments, in step T20 of FIG. 2A, the printer 300 stores the print data pimg1 in the memory 224, while associating the print image pimg1 to the job ID jb1. Instead of this configuration, however, the print 300 may store the image data img1 received in step T18, or the RGB output data generated in step T20. In this case, the printer 300 generates the print data pimg1 from the image data img1, or the RGB output data, and perform printing, in step S118 of FIG. 3.

Further, instead of allowing the printer 300 to generate the print data pimg1, it is allowable that PC 100 generates the print data pimg1. In this case, the PC 100 receives the response res1 in step T16, and then the PC 100 generates the RGB output data from the image data img1 based on the setting information st1. Further, the PC 100 generates the print data pimg1 from the RGB output data. The specific method for generating the print data pimg1 is same as the method described in relation to step T20. Afterwards, the PC 100 transmits the print data pimg1 to the printer 300 in step T18. Note that since the print data pimg1 is generated based on the setting information st1, the PC 100 is not required to transmit the print setting information st1 in step T18. In step T20, the printer 300 stores the print data pimg1 in the memory 324, while associating the print data pimg1 with the job ID jb1.

[Modification 7]

In the above-described first and second embodiments, the printer 300 is a laser printer. Instead of this configuration, however, the printer 300 may be an ink-jet printer. In general, the printing apparatus may be provided with a printing section.

[Modification 8]

Each of the processings in the above-described first and second embodiments is realized by performing the processings, in accordance with the softwares (namely, the program 126, the program 226 and the program 326), by the CPU 122 of the PC 100, the CPU 222 of the mobile terminal 200, and the CPU 322 of the printer 300, respectively. Instead of this configuration, however, the processings in the above-described first and second embodiments may be realized by hardware such as a logical circuit, etc.

What is claimed is:

1. A printing system comprising a terminal apparatus and a printing apparatus communicable with each other,
   wherein the terminal apparatus includes:
      a first inputting section;
      a first network interface; and
      a processor configured to:
         transmit a print request for printing an object image indicated by object data via the first network interface to the printing apparatus, the print request including associated authentication information associated with the object data,
   wherein the printing apparatus includes:
      a second inputting section;
      a second network interface;
      a printing section; and
      a processor configured to:
         receive the print request via the second network interface from the terminal apparatus;
         store the object data and the associated authentication information included in the print request in association with each other in a first memory;
         receive second input authentication information inputted by the user via the second inputting section, after the object data and the associated authentication information have been stored in the first memory;
         determine whether the received second input authentication information inputted by the user via the second inputting section matches the associated authentication information stored in the first memory;
         print the object image indicated by the object data by using the printing section, if the processor of the printing apparatus determines that the second input authentication information matches the associated authentication information, wherein processor of the terminal apparatus is further configured to:
- receive first input authentication information inputted by a user via the first inputting section, after the print request has been transmitted and the object data and associated authentication information have been stored in the first memory; and
- transmit a delete request for deleting the object data without printing the object image via the first network interface to the printing apparatus, the delete request including the received first input authentication information, and wherein the processor of the printing apparatus is further configured to:
- receive the delete request including the first input authentication information via the second network interface from the terminal apparatus, after the object data and the associated authentication information have been stored in the first memory;
- determine whether the first input authentication information included in the delete request received from the terminal apparatus matches the associated authentication information stored in the first memory; and
- delete the object data from the first memory without printing the object image indicated by the object data, if the processor of the printing apparatus determines that the first input authentication information matches the associated authentication information stored in the first memory.

2. The printing system according to claim 1,
wherein the print request further includes identification information for identifying the object data,
the processor of the printing apparatus stores the object data, the associated authentication information and the identification information while associating with one another in the first memory,
the terminal apparatus further includes a display,
the processor of the terminal apparatus is further configured to display on the display a deletion screen for the user to instruct deletion of the object data from the first memory, the deletion screen including an item indicating the identification information,
the processor of the terminal apparatus transmits, to the printing apparatus, the delete request for deleting the object data from the first memory via the first network interface, if the deletion of the object data has been instructed via the deletion screen and then the processor of the terminal apparatus has received the first input authentication information inputted by the user, the delete request including the identification information and the first input authentication information,
the processor of the printing apparatus receives the delete request from the terminal apparatus via the second network interface, and
the processor of the printing apparatus determines whether the first input authentication information included in the delete request matches the associated authentication information which is stored in the first memory while being associated with the identification information.

3. The printing system according to claim 2,
wherein the processor of the terminal apparatus is further configured to obtain the identification information stored in the first memory, and the deletion screen includes the item indicating the identification information obtained by the processor of the terminal apparatus.

4. The printing system according to claim 3,
wherein the printing apparatus further includes the first memory,
the first memory further stores screen information indicating the deletion screen, and
the processor of the terminal apparatus is configured to obtain the screen information, which includes the identification information, from the printing apparatus.

5. The printing system according to claim 2,
wherein the terminal apparatus further includes a second memory,
the second memory stores a standard format for displaying the deletion screen,
the processor of the terminal apparatus is further configured to:
generate screen information indicating the deletion screen by adding the identification information to the standard format; and
display, on the display, the deletion screen indicated by the screen information generated by the processor of the terminal apparatus.

6. The printing system according to claim 5,
wherein the printing system comprises a first terminal apparatus and a second terminal apparatus, as the terminal apparatus,
a processor of the first terminal apparatus is configured to transmit, to the printing apparatus in accordance with a first protocol, a first print request for printing a first object image indicated by first object data, the first print request including first associated authentication information which is associated with the first object data and first identification information for identifying the first object data,
a processor of the second terminal apparatus is configured to transmit, to the printing apparatus in accordance with a second protocol, a second print request for printing a second object image indicated by second object data, the second print request including second associated authentication information which is associated with the second object data and second identification information for identifying the second object data,
if the processor of the printing apparatus receives the first print request via the second network interface, the processor of the printing apparatus stores the first object data, the first associated authentication information, the first identification information, and the first protocol while associating with one another in the first memory,
if the processor of the printing apparatus receives the second print request via the second network interface, the processor of the printing apparatus stores the second object data, the second associated authentication information, the second identification information, and the second protocol while associating with one another in the first memory,
the processor of the first terminal apparatus is further configured to:
obtain, from the first memory in accordance with the first protocol, the first identification information stored in the first memory while being associated with the first protocol;
obtain, from the first memory in accordance with the second protocol, the second identification information stored in the first memory while being associated with the second protocol;

store the first identification information and the first protocol while associating with each other in a memory of the first terminal apparatus, if the first identification information has been obtained from the first memory; and store the second identification information and the second protocol while associating with each other in the memory of the first terminal apparatus, if the second identification information has been obtained from the first memory, the processor of the first terminal apparatus is configured to display, on a display of the first terminal apparatus, the deletion screen including a first item indicating the first identification information and a second item indicating the second identification information, the processor of the first terminal apparatus is further configured to:

specify, from the memory of the first terminal, the first protocol associated with the first identification information for identifying the first object data, if deletion of the first object data has been instructed in the deletion screen; and specify, from the memory of the first terminal, the second protocol associated with the second identification information for identifying the second object data, if deletion of the second object data has been instructed in the deletion screen, the processor of the first terminal apparatus is configured to transmit, to the printing apparatus in accordance with the first protocol, a first delete request for deleting the first object data from the first memory, if the first protocol has been specified by the processor of the first terminal apparatus, and the processor of the first terminal apparatus is configured to transmit, to the printing apparatus in accordance with the second protocol, a second delete request for deleting the second object data from the first memory, if the second protocol has been specified by the processor of the first terminal apparatus.

7. The printing system of claim 1, wherein:

the object data and the associated authentication information included in the print request are stored in the first memory in association with each other and with a corresponding job identifier, the delete request includes the received first input authentication information and the corresponding job identifier, and the processor of the printing apparatus is configured to determine whether the first input authentication information included in the delete request received from the terminal apparatus matches the associated authentication information stored in the first memory based on the corresponding job identifier.

8. The printing apparatus of claim 1, wherein:

the object data and the associated authentication information included in the print request are stored in the first memory in association with each other and with a corresponding job identifier, the delete request includes the received first input authentication information and the corresponding job identifier, and the processor of the printing apparatus is configured to determine whether the first input authentication information included in the delete request received from the terminal apparatus matches the associated authentication information stored in the first memory based on the corresponding job identifier.

9. A printing apparatus communicable with a terminal apparatus, the printing apparatus comprising:
   an inputting section;
   a network interface;
   a printing section; and
   a processor configured to:
      receive a print request for printing an object image indicated by object data from the terminal apparatus via the network interface, the print request including associated authentication information associated with the object data;
      store the object data and the associated authentication information included in the print request in association with each other in a memory;
      receive, from the terminal apparatus via the network interface, a delete request for deleting the object data without printing the object image, the delete request including first input authentication information which is inputted to the terminal apparatus by a user after the print request has been received, the delete request received after the object data and the associated authentication information have been stored in the memory;
      determine whether the first input authentication information included in the delete request received from the terminal apparatus matches the associated authentication information stored in the memory;
      receive second input authentication information inputted by a user via the inputting section, after the object data and the associated authentication information have been stored in the memory;
      determine whether the received second input authentication information inputted via the inputting section matches the associated authentication information stored in the memory;
      print the object image indicated by the object data by using the printing section, if the processor determines that the second input authentication information matches the associated authentication information stored in memory; and
      delete the object data from the memory without printing the object image indicated by the object data, if the processor determines that the first input authentication information matches the associated authentication information stored in memory.

10. The printing apparatus according to claim 9,
wherein the print request further includes identification information for identifying the object data,
the processor stores the object data, the associated authentication information and the identification information while associating with one another in the memory,
the processor receives, from the terminal apparatus via the network interface, the delete request for deleting the object data from the memory, the delete request including the identification information and the first input authentication information, and
the processor determines whether the first input authentication information included in the delete request matches the associated authentication information which is stored in the memory while being associated with the identification information.

11. The printing apparatus according to claim 10, further comprising the memory, the memory further storing screen information indicating a deletion screen, and
   the processor is configured to transmit the screen information including the identification information to the terminal apparatus via the network interface.

12. A non-transitory computer-readable medium storing instructions to a terminal apparatus which includes an inputting section, a display, and a network interface and which is communicable with a printing apparatus, the instructions, when executed by a processor of the terminal apparatus, causing the terminal apparatus to:
- display, on the display, a deletion screen which is for a user to instruct deletion of object data from a first memory of the printing apparatus and which includes an item indicating identification information for identifying the object data, after a print request including associated authentication information associated with the object data and the identification information for identifying the object data has been received by the printing apparatus from the terminal apparatus and the object data, the associated authentication information, and the identification information have been stored in the first memory in association with one another, the print request being a request for printing an object image indicated by the object data;
- receive input authentication information inputted by the user via the inputting section, after the print request has been transmitted and the object data, associated authentication information, and identification information have been stored in the first memory; and
- transmit, to the printing apparatus via the network interface, a delete request including the identification information and the input authentication information, if the deletion of the object data has been instructed via the deletion screen and the input authentication information inputted by the user has been received,
- wherein the delete request is a request for deleting the object data from the first memory without printing the object image indicated by the object data, receipt of the delete request by the printing apparatus causing the printing apparatus to delete the object data if the input authenticating information included in the delete request matches the associated authentication information stored in the first memory of the printing apparatus in association with the identification information.

13. The medium according to claim 12, wherein the instructions further cause the terminal apparatus to obtain the identification information stored in the first memory.

14. The medium according to claim 13,
wherein the terminal apparatus further includes a second memory,
the second memory stores a standard format for displaying the deletion screen,
the instructions further cause the terminal apparatus to generate screen information indicating the deletion screen by adding, to the standard format, the identification information obtained from the first memory, and
the terminal apparatus displays, on the display, the deletion screen indicated by the screen information.

15. The medium according to claim 14,
wherein the instructions further cause the terminal apparatus to:
- obtain, from the first memory in accordance with a first protocol, a first identification information for identifying first object data and stored in the first memory while being associated with the first protocol;
- obtain, from the first memory in accordance with a second protocol, a second identification information for identifying second object data and stored in the first memory while being associated with the second protocol;
- store the first identification information and the first protocol while associating with each other in the second memory, if the first identification information has been obtained from the first memory; and
- store the second identification information and the second protocol while associating with each other in the second memory, if the second identification information has been obtained from the first memory;
- the instructions cause the terminal apparatus to display the deletion screen including a first item indicating the first identification information and a second item indicating the second identification information, on the display, the instructions further cause the terminal apparatus to:
- specify, from the second memory, the first protocol associated with the first identification information for identifying the first object data, if deletion of the first object data has been instructed via the deletion screen; and
- specify, from the second memory, the second protocol associated with the second identification information for identifying the second object data, if deletion of the second object data has been instructed via the deletion screen,
- the instructions cause the terminal apparatus to transmit, to the printing apparatus via the network interface in accordance with the first protocol, a first delete request for deleting the first object data from the first memory, if the first protocol has been specified, and
- the instructions cause the terminal apparatus to transmit, to the printing apparatus via the network interface in accordance with the second protocol, a second delete request for deleting the second object data from the first memory, if the second protocol has been specified.

16. The medium according to claim 12, wherein the instructions further cause the terminal apparatus to transmit the print request to the printing apparatus via the network interface.

* * * * *